(12) United States Patent
Shimizu

(10) Patent No.: US 7,675,639 B2
(45) Date of Patent: Mar. 9, 2010

(54) IMAGE FORMING APPARATUS AND METHOD OF CONTROLLING THE SAME

(75) Inventor: Yukihiko Shimizu, Urayasu (JP)

(73) Assignee: Canon Kabushiki Kaisha (JP)

( * ) Notice: Subject to any disclaimer, the term of this patent is extended or adjusted under 35 U.S.C. 154(b) by 999 days.

(21) Appl. No.: 11/404,603

(22) Filed: Apr. 14, 2006

(65) Prior Publication Data

US 2006/0232812 A1 Oct. 19, 2006

(30) Foreign Application Priority Data

Apr. 15, 2005 (JP) .............................. 2005-118841

(51) Int. Cl.
*G06F 15/00* (2006.01)
*G06Q 10/00* (2006.01)

(52) U.S. Cl. ........................................ 358/1.14; 705/28

(58) Field of Classification Search ................ 358/1.14, 358/1.15, 1.16, 1.13, 1.18, 474, 3.06, 296, 358/1.11, 3.28, 401, 1.12, 400, 450, 502, 358/530; 705/28, 40, 400; 382/182, 195, 382/284; 399/12, 8, 77, 75, 51, 159, 299, 399/388; 709/203, 206, 223, 227; 396/604, 396/575

See application file for complete search history.

(56) References Cited

U.S. PATENT DOCUMENTS

2006/0146367 A1* 7/2006 Kaneko et al. ............. 358/1.15

FOREIGN PATENT DOCUMENTS

| JP | 10-149066 A | 6/1998 |
|---|---|---|
| JP | 2000-181297 A | 6/2000 |

* cited by examiner

*Primary Examiner*—Saeid Ebrahimi Dehkordy
(74) *Attorney, Agent, or Firm*—Rossi, Kimms & McDowell LLP

(57) ABSTRACT

There is provided an image forming apparatus capable of reducing the time required to resume image formation by appropriately controlling whether a stopped state transferring process is executed in a case where a printer section is in the operating state and an error that makes image formation by the image forming apparatus impossible has occurred. A CPU carries out an operating state transferring process that causes a printer section to transfer from a stopped state to an operating state and a stopped state transferring process that causes the printer section to transfer from the operating state to the stopped state. The CPU controls whether to carry out the stopped state transferring process in a case where the printer section is in the operating state and an error that makes image formation by the MFP (Multi Function Peripheral) impossible has occurred.

14 Claims, 18 Drawing Sheets (a)

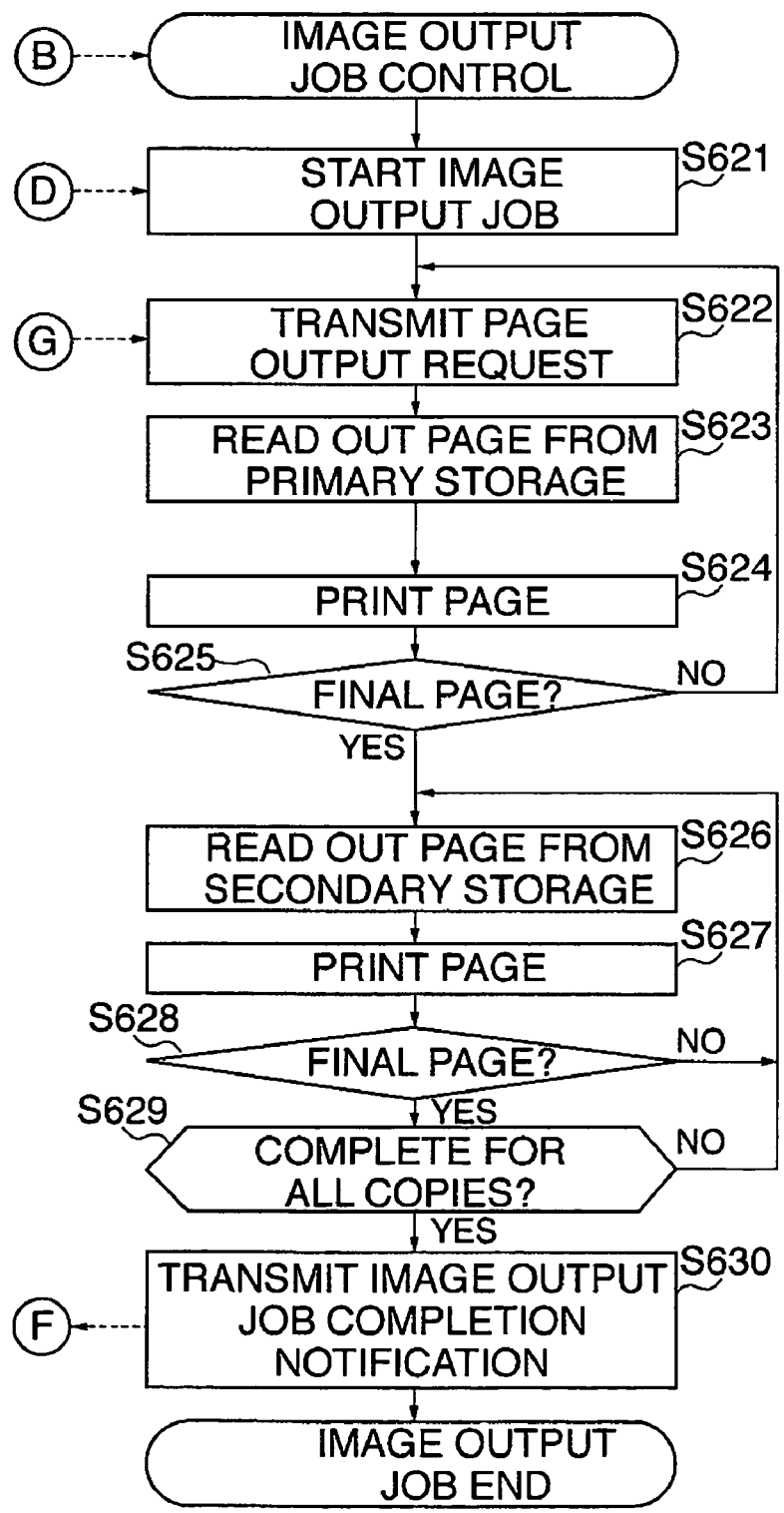

FIG. 10A

AN ERROR HAS OCCURRED: ■■■
PERFORM RECOVERY PROCEDURE
WITHOUT STOPPING ENGINE?

[MAINTAIN] [STOP]

FIG. 10B

WARNING!
ENGINE WILL NOT STOP DURING
RECOVERY PROCEDURE.
DO NOT TOUCH HIGH TEMPERATURE
PARTS OR ROTATING PARTS.

[RETURN] [OK]

FIG. 10C

ATTENTION!
IF ENGINE IS STOPPED,
IT WILL TAKE TIME UNTIL
JOBS CAN BE RESUMED.
CONTINUE?

[RETURN] [OK]

*FIG. 12A*

WARNING!
SHEET FEEDING ROLLER AND PERIPHERY STOPPED DUE TO SHEET FEEDING JAM.
MAIN ENGINE IDLING.
PERFORM RECOVERY PROCEDURE ACCORDING TO GUIDE

 OK

*FIG. 12B*

WARNING!
INTERMEDIATE TRANSFER BELT DEFECTIVE.
MAIN ENGINE STOPPED.
PERFORM RECOVERY PROCEDURE ACCORDING TO GUIDE

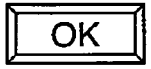 OK

*FIG. 12C*

IF RECOVERY PROCEDURE WILL TAKE 10 MINUTES OR MORE, STOPPING IDLING IS RECOMMENDED.
CONTINUE IDLING?

 MAINTAIN   STOP

FIG. 12D

INPUT MAINTENANCE TIME
REQUIRED FOR RECOVERY
PROCEDURE

☐ MINUTES

[OK]  [clear]

FIG. 12E

RECOVERY PROCEDURE AWAITED
SINCE 10 MINUTES HAVE PASSED,
ENGINE NOW IDLING AT HALF SPEED.
ENGINE WILL STOP AFTER 10 MINUTES

[CANCEL]

FIG. 12F

SHEET FEEDING JAM BEING CLEARED.
SHEET FEEDING ROLLER AND PERIPHERY
BEING DRIVEN.
NORMAL SPEED WILL BE RESTORED
AND OUTPUT WILL CONTINUE SHORTLY.

WARNING!
INSUFFICIENT A3-NOBI SHEETS.
SHEETS WILL RUN OUT IN 10 MINUTES.
REFILL SHEETS IN CASSETTE 2.

IF REFILLING WILL TAKE 10 MINUTES OR MORE, SELECT "PERMIT".
REDUCE SPEED?

[PERMIT] [INHIBIT]

*FIG. 14C*

INPUT MAINTENANCE TIME PERIOD REQUIRED FOR REFILLING SHEETS

☐ MINUTES

[OK] [clear]

*FIG. 14D*

AWAITING REFILLING WITH SHEETS.
SINCE 5 MINUTES HAVE PASSED, PAGES ARE NOW BEING OUTPUTTED AT HALF SPEED.
SHEETS WILL RUN OUT IN 15 MINUTES

[CANCEL]

*FIG. 14E*

CHECKING REFILLED SHEETS
A3-NOBI SHEETS HAVE BEEN REFILLED IN CASSETTE 2.
OUTPUT WILL CONTINUE AT NORMAL SPEED

[OK]

IMAGE FORMING APPARATUS AND METHOD OF CONTROLLING THE SAME

BACKGROUND OF THE INVENTION

1. Field of the Invention

The present invention relates to an image forming apparatus and a method of controlling the same.

2. Description of the Related Art

There is conventionally known an image forming apparatus that forms an image on a recording medium such as paper based on image information.

In such image forming apparatus, an image forming section that carries out image formation operates in one of an operating state where image formation is possible and a stopped state where image formation is impossible. For example, an image forming section that carries out image formation according to an electrophotographic technique forms a developer (toner) image on a cylindrical photosensitive drum based on image information, but to do so, in the operating state, it is necessary to rotate the photosensitive drum in advance and to apply a predetermined voltage to the photosensitive drum from a charger section. On the other hand, in the stopped state, it is necessary to stop the rotation of the photosensitive drum and to stop the application of voltage to the photosensitive drum from the charger section. It should be noted here that a predetermined transfer time period is necessary for an operating state transferring process for causing the image forming section in the stopped state to transfer to the operating state and a predetermined transfer time period is also necessary to cause the image forming section in the operating state to transfer to the stopped state.

Some image forming apparatuses also have a function for transferring, when the image forming section is in the stopped state and a predetermined time period has elapsed, for example, to a low-energy mode where power consumption of the entire image forming apparatus is suppressed. In an image forming apparatus equipped with a low-energy mode, when image information obtained by reading an original has been stored in a memory, a problem may occur where the image information stored in the memory is erased when the image forming apparatus transfers to the low-energy mode. For this reason, an image forming apparatus (see, for example, Japanese Laid-Open Patent Publication (Kokai) No. H10-149066) has been proposed where the image forming section is prevented from transferring to the stopped state by comparing a remaining number of sheets in a cassette that stores the sheets used for image formation with a number of such sheets required to complete the image formation and reducing the image formation speed (i.e., reducing the number of pages subjected to image formation per unit time) when the number of sheets remaining in the cassette is too low.

There is also the problem that when a plurality of image formation jobs are consecutively executed (here, an "image formation job" refers to a process where image formation is carried out by the image forming section for image information composed of a plurality of pages, for example), the image forming section may transfer from the operating state to the stopped state if preparation for executing an image formation job that follows after completion of an earlier image formation job has not been completed in time. Since the operating state transferring process of the image forming section is executed after the preparation for the succeeding image formation job has been completed (for example, an expansion process that expands image information in page description language format to image information that can be processed by the image forming section has been completed), there is the problem that the following image formation job cannot start immediately. For this reason, an image forming apparatus (see, for example, Japanese Laid-Open Patent Publication (Kokai) No. 2000-181297) that idles (an operation where a photosensitive drum and the like are rotated and the image forming section is kept in the operating state) without a stopped state transferring process where the image forming section transfers from the operating state to the stopped state being executed after the preceding image formation job is completed is also known.

However, with the image forming apparatus of the above-mentioned Japanese Laid-Open Patent Publication (Kokai) No. H10-149066, there is the problem that if the image formation speed is reduced, that is, the interval for feeding sheets on which images are formed is increased, productivity (the number of pages on which images are formed per unit time) will fall during the time period where the sheet feeding interval is increased.

Also, with the image forming apparatus of the above-mentioned Japanese Laid-Open Patent Publication (Kokai) No. 2000-181297, if the stopped state transferring process is executed in a case where an error that makes image formation impossible has occurred, such as when there are no more sheets for use by the image forming section during execution of an image formation job (that is, there are no more sheets in the cassette storing the sheets in use), it will not be possible to resume the interrupted image formation job until execution of the stopped state transferring process and the operating state transferring process has been completed.

SUMMARY OF THE INVENTION

The present invention was conceived in view of the problems described above and it is an object of the present invention to provide an image forming apparatus and a method of controlling the same which are capable of reducing the time required to resume image formation by appropriately controlling whether a stopped state transferring process is executed in a case where an image forming section is in an operating state and image formation by the image forming apparatus has become impossible.

To attain the above object, in a first aspect of the present invention, there is provided an image forming apparatus that forms an image on a recording medium, comprising an image information input section that inputs image information, an image forming section that forms an image on a recording medium based on the input image information inputted by the image information input section, an operating state processing section that executes an operating state transferring process that causes the image forming section to transfer from a stopped state to an operating state and a stopped state transferring process that causes the image forming section to transfer from the operating state to the stopped state, and a control section that controls whether the stopped state transferring process is to be executed by the operating state processing section in a case where the image forming section is in the operating state and an error that makes image formation by the image forming apparatus impossible has occurred.

According to the above construction, it is possible to reduce the time required to resume image formation by appropriately controlling whether the stopped state transferring process is executed in a case where the image forming section is in the operating state and an error that makes image formation by the image forming apparatus impossible has occurred.

Preferably, an image forming apparatus further comprises a selection section that allows an operator of the image forming apparatus to select whether the stopped state transferring process is to be executed by the operating state processing section in accordance with an error that makes image formation by the image forming apparatus impossible having occurred in a case where the image forming section is in the operating state, wherein the control section controls the operating state processing section to execute the stopped state transferring process in a case where the selection section has selected that the stopped state transferring process is to be executed, and not to execute the stopped state transferring process in a case where the selection section has selected that the stopped state transferring process is not to be executed.

More preferably, the selection section allows the operator of the image forming apparatus to select whether the stopped state transferring process is to be executed via a display section that displays a screen for allowing the operator of the image forming apparatus to select whether the stopped state transferring process is to be executed.

Preferably, an image forming apparatus further comprises an input section that inputs a necessary time period required until the image forming apparatus is capable of carrying out image formation in accordance with an error that makes image formation by the image forming apparatus impossible having occurred in a case where the image forming section is in the operating state, wherein in a case where the error that makes image formation by the image forming apparatus impossible is still present when the necessary time period has elapsed following input of the necessary time period by the input section, the operating state processing section carries out the stopped state transferring process in accordance with the necessary time period having elapsed.

More preferably, the input section inputs the necessary time period based on the error that makes image formation by the image forming apparatus impossible.

Preferably, an image forming apparatus further comprises an input section that inputs a necessary time period required until the image forming apparatus is capable of carrying out image formation in accordance with an error that makes image formation by the image forming apparatus impossible having occurred in a case where the image forming section is in the operating state, wherein the control section controls, based on the necessary time period, an image formation speed by the image forming section in a case where an error that makes image formation by the image forming apparatus impossible has occurred and the stopped state transferring process is not carried out.

Preferably, an image forming apparatus further comprises an input section that inputs a necessary time period required until the image forming apparatus is capable of carrying out image formation in accordance with an error that makes image formation by the image forming apparatus impossible having occurred in a case where the image forming section is in the operating state, wherein the operating state processing section carries out the stopped state transferring process in a case where the inputted necessary time period is longer than a total of a stopped state transferring time period required by the stopped state transferring process and an operating state transferring time period required by the operating state transferring process.

Preferably, an image forming apparatus further comprises a determining section that determines whether the operating state of the image forming section is capable of being maintained in a case where the image forming section is in the operating state and an error that makes image formation by the image forming apparatus impossible has occurred, wherein the control section controls the operating state processing section to maintain the operating state in a case where the determining section has determined that the operating state of the image forming section is capable of being maintained, and controls the operating state processing section to carry out the stopped state transferring process in a case where the determining section has determined that the operating state of the image forming section is not capable of being maintained.

Preferably, the image forming section includes an image carrying section that carries a developer image based on the image information, a transfer section that transfers the developer image carried by the image carrying section onto the recording medium, and a cleaning section that removes the developer image that is not transferred onto the recording medium and remains on the image carrying section, and wherein the stopped state transferring process relates to cleaning of the developer image by the cleaning section.

Preferably, the image forming section includes an image carrying section that carries a developer image based on the image information, a transfer section that transfers the developer image carried by the image carrying section onto the recording medium, and a density control section that controls a density of the developer image carried by the image carrying section, and wherein the stopped state transferring process relates to control of the density by the density control section.

Preferably, the image forming section includes an image carrying section that carries a developer image based on the image information, a transfer section that transfers the developer image carried by the image carrying section onto the recording medium, and a developer supplying section that supplies developer to the image carrying section, and wherein an error that makes image formation impossible occurs for the image forming apparatus in a case where an amount of developer to be supplied to the developer supplying section is a predetermined amount or less.

Preferably, an image forming apparatus further comprises a conveying section that conveys the recording medium, wherein an error that makes image formation impossible occurs for the image forming apparatus in a case where the conveying section is incapable of conveying the recording medium.

Preferably, an image forming apparatus further comprises a recording medium supplying section that supplies the recording medium, wherein an error that makes image formation impossible occurs for the image forming apparatus in a case where the recording medium supplying section is incapable of supplying the recording medium.

To attain the above object, in a second aspect of the present invention, there is provided a method of controlling an image forming apparatus including an image forming section that forms an image on a recording medium, the method comprising an image forming step of forming an image on a recording medium based on inputted image information, an operating state processing step of executing an operating state transferring process that causes the image forming section to transfer from a stopped state to an operating state and a stopped state transferring process that causes the image forming section to transfer from the operating state to the stopped state, and a control step of controlling whether the stopped state transferring process is to be executed by the operating state processing step in a case where the image forming section is in the operating state and an error that makes image formation by the image forming apparatus impossible has occurred.

The above and other objects, features, and advantages of the invention will become more apparent from the following detailed description taken in conjunction with the accompanying drawings.

BRIEF DESCRIPTION OF THE DRAWINGS

FIGS. 6A to 6C are flowcharts showing the control procedures of a PDL print session appearing in FIG. 5 and an image input job and an image output job that compose the PDL print session, as one example of session control and job control procedures carried out by a CPU of the core section when every component element of the MFP is operating normally;

FIGS. 10A to 10C are views showing examples of display screens displayed by the operating section, with FIG. 10A showing an example display screen displayed by the operating section in a step S1004 in FIG. 9, FIG. 10B showing an example display screen displayed by the operating section in a step S1005 in FIG. 9, and FIG. 10C showing an example display screen displayed by the operating section in a step S1006 in FIG. 9;

FIGS. 12A to 12F are views showing examples of display screens displayed by the operating section, with FIGS. 12A and 12B showing example display screens displayed by the operating section in a step S1201 in FIG. 11, FIG. 12C showing an example display screen displayed by the operating section in a step S1202 in FIG. 11, FIG. 12D showing an example display screen displayed by the operating section in a step S1203 in FIG. 11, FIG. 12E showing an example display screen displayed by the operating section in a step S1204 in FIG. 11, and FIG. 12F showing an example display screen displayed by the operating section in a step S1207 in FIG. 11;

FIGS. 14A to 14E are views showing examples of display screens displayed by the operating section, with FIG. 14A showing an example display screen displayed by the operating section in a step S1401 in FIG. 13, FIG. 14B showing an example display screen displayed by the operating section in a step S1402 in FIG. 13, FIG. 14C showing an example display screen displayed by the operating section in a step S1403 in FIG. 13, FIG. 14D showing an example display screen displayed by the operating section in a step S1405 in FIG. 13, and FIG. 14E showing an example display screen displayed by the operating section in a step S1407 in FIG. 13.

DETAILED DESCRIPTION OF THE PREFERRED EMBODIMENTS

Figure 1:
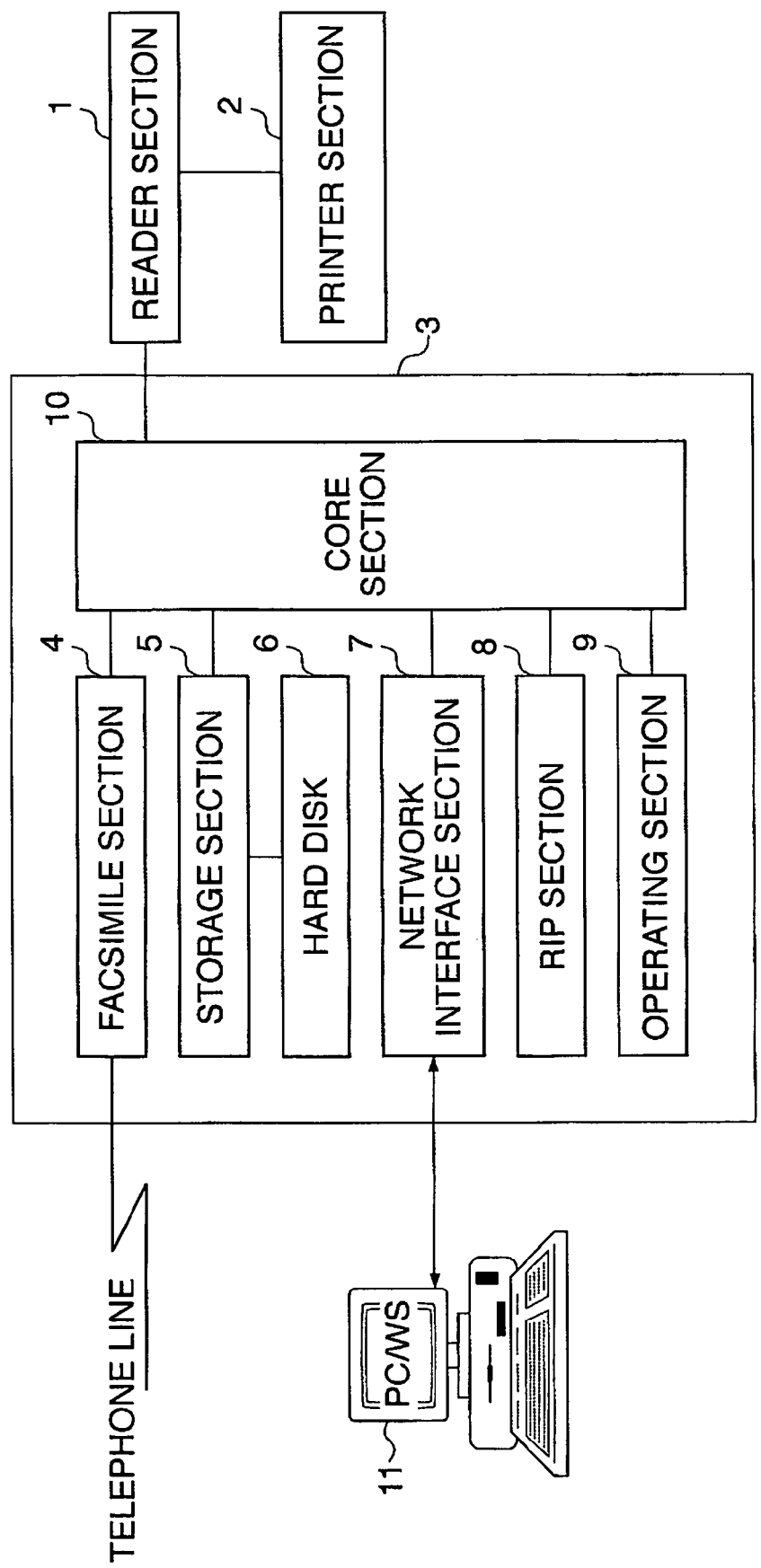
FIG. 1 is a block diagram showing the construction of a multi function peripheral (hereinafter "MFP") applied as an image forming apparatus according to an embodiment of the present invention.

The present invention will now be described in detail with reference to the drawings showing a preferred embodiment thereof. In the drawings, elements and parts which are identical throughout the views are designated by identical reference numerals, and duplicate description thereof is omitted.

FIG. 1 is a block diagram showing the construction of a multi function peripheral (hereinafter "MFP") applied as an image forming apparatus according to an embodiment of the present invention.

In FIG. 1, a reader section 1 photoelectrically reads an image on an original using an image sensor such as a CCD and outputs image data (image information) corresponding to the original to an image input/output control section 3. A printer section 2 is a laser beam printer, for example, and forms an image corresponding to image data from the image input/output control section 3 on a sheet (recording medium). The image input/output control section 3 is connected to the reader section 1 and the printer section 2, and includes a facsimile section 4, a storage section 5, a network interface section 7, a RIP (Raster Image Processor) section 8, an operating section 9, and a core section 10.

The facsimile section 4 decompresses compressed image data received via a telephone line and transfers the decompressed image data to the core section 10, or compresses image data transferred from the core section 10 and transmits the compressed image data via the telephone line to a recipient. Such transmitted and received image data can be temporarily stored on a hard disk 6 connected to the storage section 5.

The storage section 5 has the hard disk 6 connected thereto and compresses image data transferred from the core section 10 and stores the image data together with an ID number used for searching for image data in the hard disk 6. The storage section 5 searches for compressed image data stored in the hard disk 6 based on code data transferred via the core section 10, reads out and decompresses the compressed image data found by searching, and transfers the decompressed image data to the core section 10. The hard disk 6 has a storage capacity of 20 gigabytes, for example, and depending on the sizes of the respective images, is capable of storing 2,500 pages of compressed A4-sized color images.

In addition, the storage section 5 detects whether the hard disk 6 is connected and whether the hard disk 6 is defective by carrying out a command/response operation via a hard disk interface and a write or read of predetermined data to inquire to the hard disk 6.

The network interface section 7 is an interface between a personal computer or workstation (PC/WS) 11 and the core section 10, and may be constructed so as to be peer-to-peer (i.e., one-to-one) connected to the PC/WS 11 and/or connected to a network to which a variety of appliances are connected.

The RIP section 8 expands code data expressing an image transferred from the PC/WS 11 to image data that can be recorded by the printer section 2. The code data may be printer description language (hereinafter, "PDL"), a representative example of which is Postscript.

The operating section 9 includes a touch panel display and hard keys, so that operation instructions, operation settings, and the like can be made for the MFP via a user interface.

The core section 10 controls the respective flows of data between the reader section 1, the printer section 2, the facsimile section 4, the storage section 5, the network interface section 7, the RIP section 8, and the operating section 9.

Figure 2:
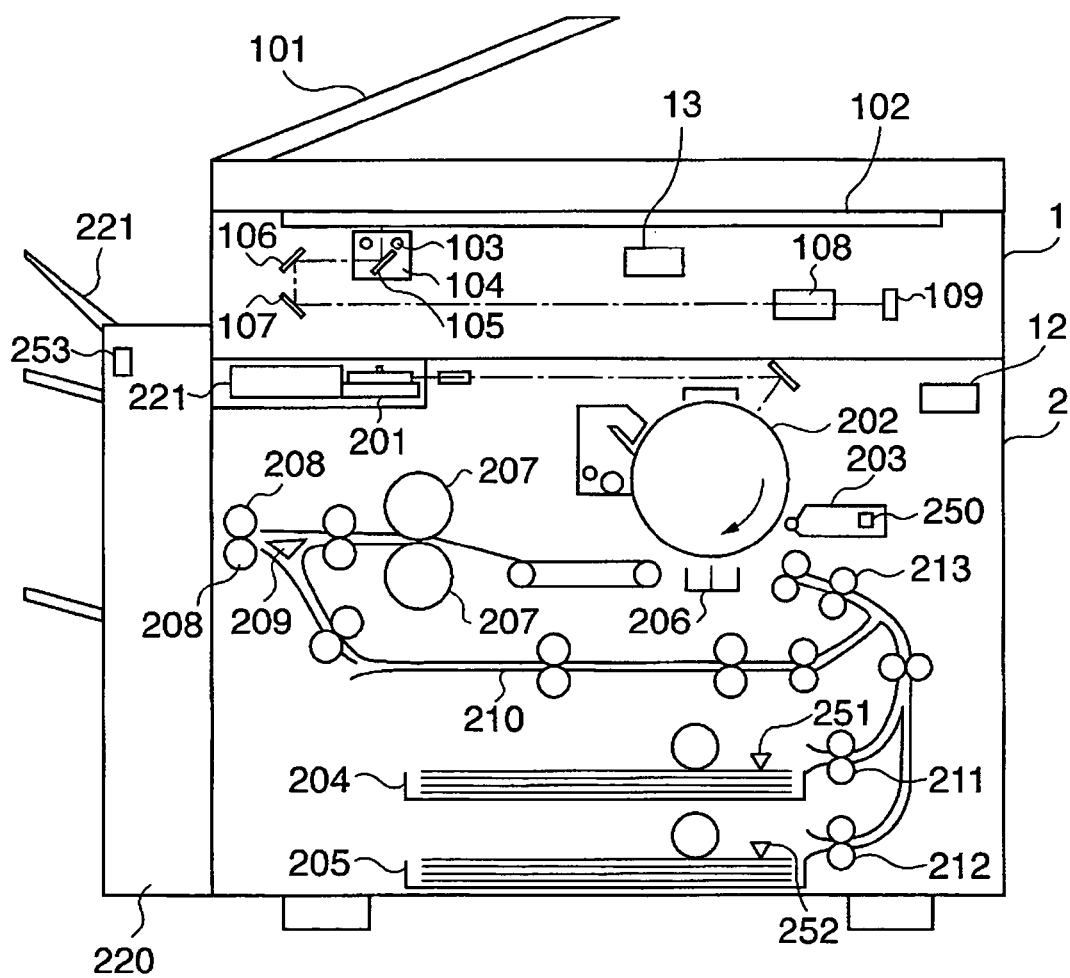
FIG. 2 is a cross-sectional view of a reader section and a printer section.

FIG. 2 is a cross-sectional view of the reader section 1 and the printer section 2.

An original feeding apparatus 101 of the reader section 1 feeds an original with multiple pages set by the user at a predetermined stacking position one page at a time from a first page to a last page onto a platen glass 102, and after a reading operation is complete for an original page (i.e., one page of an original), discharges the page on the platen glass 102 to a predetermined discharge position. When an original page has been conveyed onto the platen glass 102, a lamp 103 is lighted and movement of a scanner unit 104 is started so that the original page is exposed to light and scanned. Light reflected from the original page is guided by mirrors 105 to 107 and a lens 108 to become incident on a CCD image sensor (hereinafter simply "CCD") 109. In this way, an image of the scanned original page is photoelectrically converted by the CCD 109 to become electric signal data. The image data outputted from the CCD 109 is subjected to A/D conversion and desired image processing such as shading correction and color conversion and is then transferred to the core section 10 of the image input/output control section 3, not shown.

A laser driver 221 of the printer section (image forming section) 2 drives a laser emitting section 201 so that laser light of an intensity corresponding to the image data outputted from the core section 10 of the image input/output control section 3, not shown, is emitted by the laser emitting section 201. This laser light is incident on a photosensitive drum 202 so that a latent image corresponding to the laser light is formed on the photosensitive drum 202. A developing device 203 attaches developer (toner) to a part of the photosensitive drum 202 where the latent image is formed. The developing device 203 stores toner that is the developer to be attached to the photosensitive drum 202, and includes a toner amount sensor 250 that detects whether a stored amount of toner is a predetermined amount or less (for example, 10% or 0% of full capacity).

In addition, in timing synchronized with a start of emission of the laser light, a recording sheet (recording medium) is fed from one of an upper cassette 204 and a lower cassette 205 via sheet feeding rollers 211 or sheet feeding rollers 212 and then sheet feeding rollers 213 to a transfer section 206. The developer image carried (held) by the photosensitive drum 202 is transferred onto the recording sheet. The recording sheet onto which the developer has been transferred is conveyed to a fixing section 207 where the developer is fixed to the recording sheet by heat and pressure applied by the fixing section 207. The recording sheet that has passed the fixing section 207 is discharged by discharge rollers 208, and a finisher 220 bundles and sorts a plurality of the discharged recording sheets or carries out a stapling process at a desired position of sorted recording sheets. When double-sided recording is set, after a recording sheet that has had an image recorded on one side thereof is conveyed to the discharge rollers 208, the direction of rotation of the discharge rollers 208 is reversed and the recording sheet is guided by a flapper 209 to a refeeding conveying path 210. The recording sheet guided to the refeeding conveying path 210 is fed to the transfer section 206 in the timing mentioned above so that an image is recorded on the opposite side of the recording sheet.

Sheet stacking amount sensors 251, 252 that detect whether the amount of sheets stacked on the upper cassette 204 and the lower cassette 205 respectively is a predetermined amount or less are provided in the vicinity of the upper cassette 204 and the lower cassette 205. A staple loading amount sensor 253 that detects whether there is a predetermined amount or less of staples is also provided inside the finisher 220.

The reader section 1 is equipped with a motor driving control section 13 that drives a motor for feeding originals. The printer section 2 is equipped with a motor driving control section 12 that drives a motor for rotating the sheet feeding rollers 212, the photosensitive drum 202, and the like.

It should be noted that the printer section 2 operates in one of an operating state where image formation is possible and a stopped state where image formation is impossible. Also, it is necessary to execute an operating state transferring process to cause the printer section 2 in the stopped state to transfer to the operating state and to execute a stopped state transferring process to cause the printer section 2 in the operating state to transfer to the stopped state.

The operating state transferring process and the stopped state transferring process will now be described.

For the printer section 2, in the operating state, it is necessary to rotate the photosensitive drum 202 in advance and to apply a predetermined voltage from a charger, not shown, to the photosensitive drum 202. For this reason, to cause the printer section 2 in the stopped state to transfer to the operating state, it is necessary to execute processes such as a process that causes the photosensitive drum 202 to transfer from a stopped state to a rotating state and a process that transfers the charger from a stopped state where no voltage is applied to a voltage-applying state, with such processes being collectively referred to as the "operating state transferring process". It should be noted that a predetermined operating state transferring time period is required to execute the operating state transferring process.

In the stopped state of the printer section 2, toner must not remain on the photosensitive drum 202 and densities of respective colors used when forming a color image must be set at desired densities. For this reason, to cause the printer section 2 in the operating state to transfer to the stopped state, it is necessary to execute a cleaning process that collects toner remaining on the photosensitive drum 202 (for example, by rotating the photosensitive drum 202 one or more times, the photosensitive drum 202 is cleaned by a cleaning member provided at one position of the circumference of the photosensitive drum 202). It is also necessary to execute a density setting process (for example, a process that forms toner images on the photosensitive drum 202 based on specified image information, detects the densities of the toner images of the respective colors using sensors, and sets the densities of the respective colors based on the detection results) to set the densities of the respective colors at desired densities when image formation is resumed. Such processes are collectively referred to as the "stopped state transferring process", with a predetermined stopped state transferring time period being required to execute the stopped state transferring process.

Figure 3:
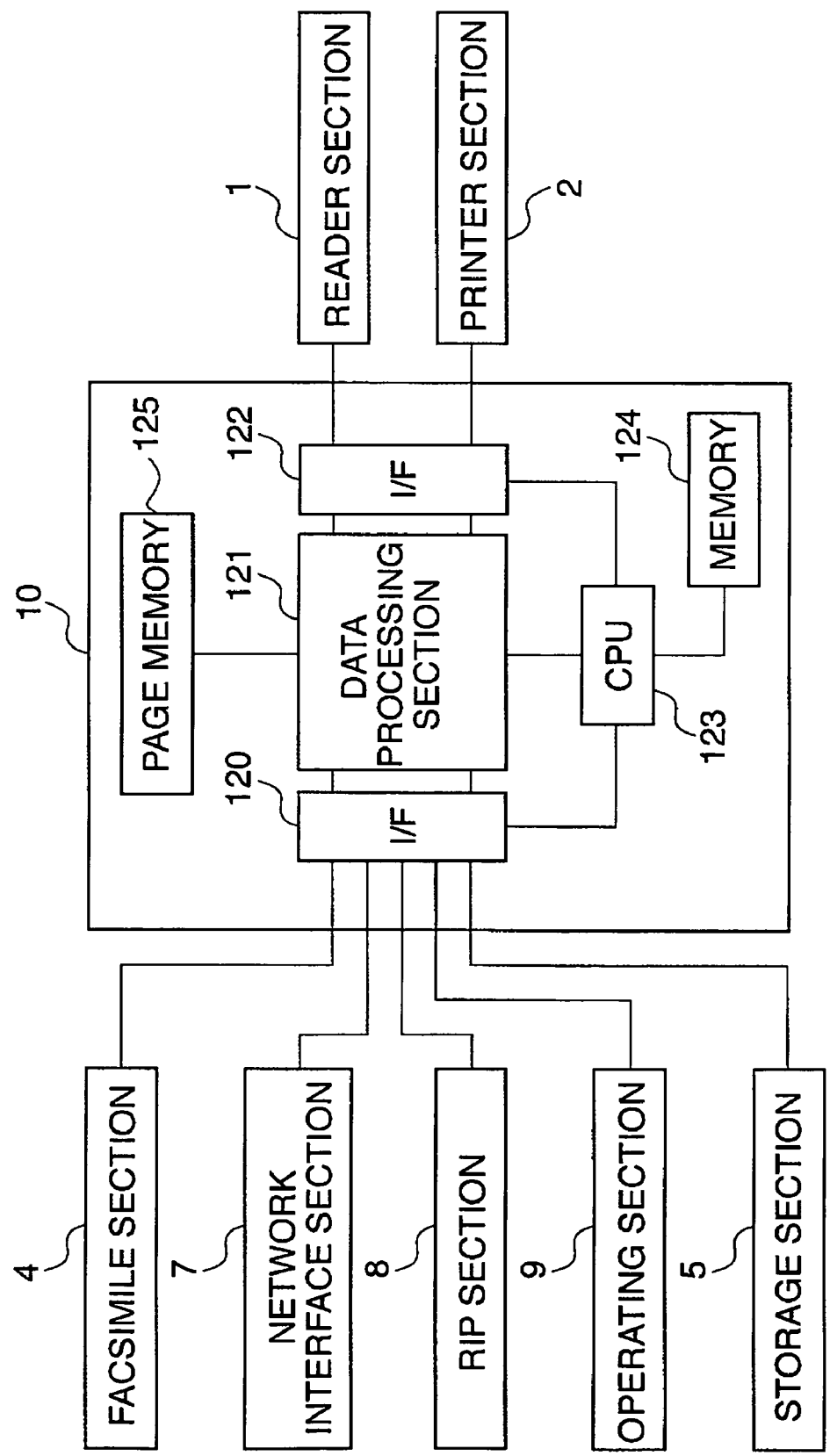
FIG. 3 is a block diagram showing the construction of a core section.

FIG. 3 is a block diagram showing the construction of the core section 10.

Image data received from the reader section 1 is transmitted to a data processing section 121 via an interface 122. The data processing section 121 carries out image processing, such as an image rotation process and a zooming process, and compresses and decompresses the image data, and is connected to a page memory 125 capable of storing a predetermined amount of predetermined image data. The data processing section 121 temporarily stores the image data inputted from the reader section 1 in the page memory 125, compresses the image data, and transmits the compressed image data via an interface 120 to the storage section 5.

Code data (PDL) that represents an image inputted via the network interface section 7 is transmitted via the interface 120 to the data processing section 121 and then sent back via the interface 120 to the RIP section 8. In the RIP section 8, the received code data is converted to image data and the converted image data is transmitted again to the data processing section 121. The data processing section 121 temporarily stores the image data received from the RIP section 8 in the page memory 125, compresses the image data, and then transmits the compressed image data to the storage section 5.

Image data inputted from the facsimile section 4 is transmitted to the data processing section 121 via the interface 120, is temporarily stored in the page memory 125, is compressed, and is then transmitted to the storage section 5.

Image data inputted from the storage section 5 is transmitted to the data processing section 121 via the interface 120, is decompressed and temporarily stored in the page memory 125, and is then transmitted to the printer section 2, the facsimile section 4, or the network interface section 7.

It should be noted that after various image data is transmitted to the data processing section 121 mentioned above and temporarily stored in the page memory 125, the core section 10 not only transmits the image data to the storage section 5 but may also transmit the image data to the printer section 2, the facsimile section 4, the network interface section 7 or a combination of a plurality of transmission recipients by switching an internal selector, not shown.

A CPU 123 carries out control of the various operations described above based on a control program stored in a memory 124 and control commands received from the operating section 9. The memory 124 is also used as a work area of the CPU 123.

In this way, processes that are combinations of functions such as reading original images, printing out images, transmitting/receiving images, storing images, and inputting/outputting data to or from a computer can be executed centered on the core section 10 via the data processing section 121 and the page memory 125.

Although the storage section 5 is provided inside the appliance (MFP) in the example described above, the storage section 5 may be provided in a server located in the periphery and connected via a network.

Figure 4:
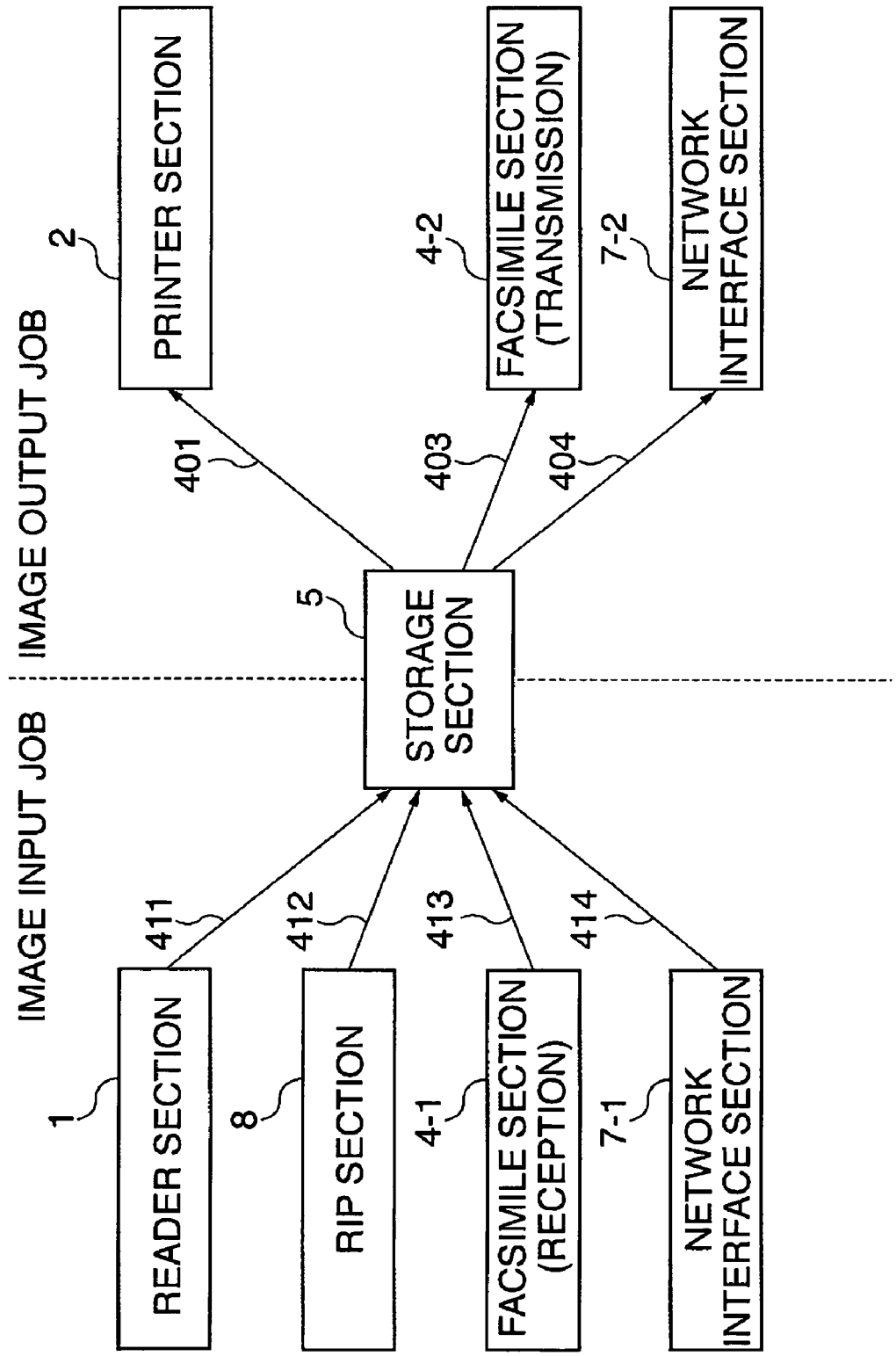
FIG. 4 is a block diagram for explaining job control.

Next, an example of job control carried out by the CPU 123 of the core section 10 will be described with reference to FIG. 4 for the case where all of the component elements of the MFP are operating normally. FIG. 4 is a block diagram for explaining the job control and logically shows units of the job control.

The units of job control are input and output processes for a group of image data composed of one or more pages. Also, the types of jobs to be controlled are roughly classified into image input jobs and image output jobs.

The image input jobs are further classified into an image input job 411 that successively records image data read by the reader section 1 into the storage section 5, an image input job 412 that successively records image data expanded by the RIP section 8 into the storage section 5, an image input job 413 that successively records image data received by a facsimile section 4-1 into the storage section 5, and an image input job 414 that successively records image data inputted from a network interface section 7-1 into the storage section 5.

The image output jobs are further classified into an image output job 401 that successively outputs image data read from the storage section 5 to the printer section 2, an image output job 403 that successively outputs image data read from the storage section 5 to a facsimile section 4-2, and an image output job 404 that successively outputs image data read from the storage section 5 to a network interface section 7-2.

It should be noted that the expression "facsimile section 4-1" indicates a data receiving function of the facsimile section 4 and the expression "facsimile section 4-2" indicates a data transmitting function of the facsimile section 4. In the same way, the expression "network interface section 7-1" indicates a data receiving function of the network interface section 7 and the expression "network interface section 7-2" indicates a data transmitting function of the network interface section 7.

Figure 5:
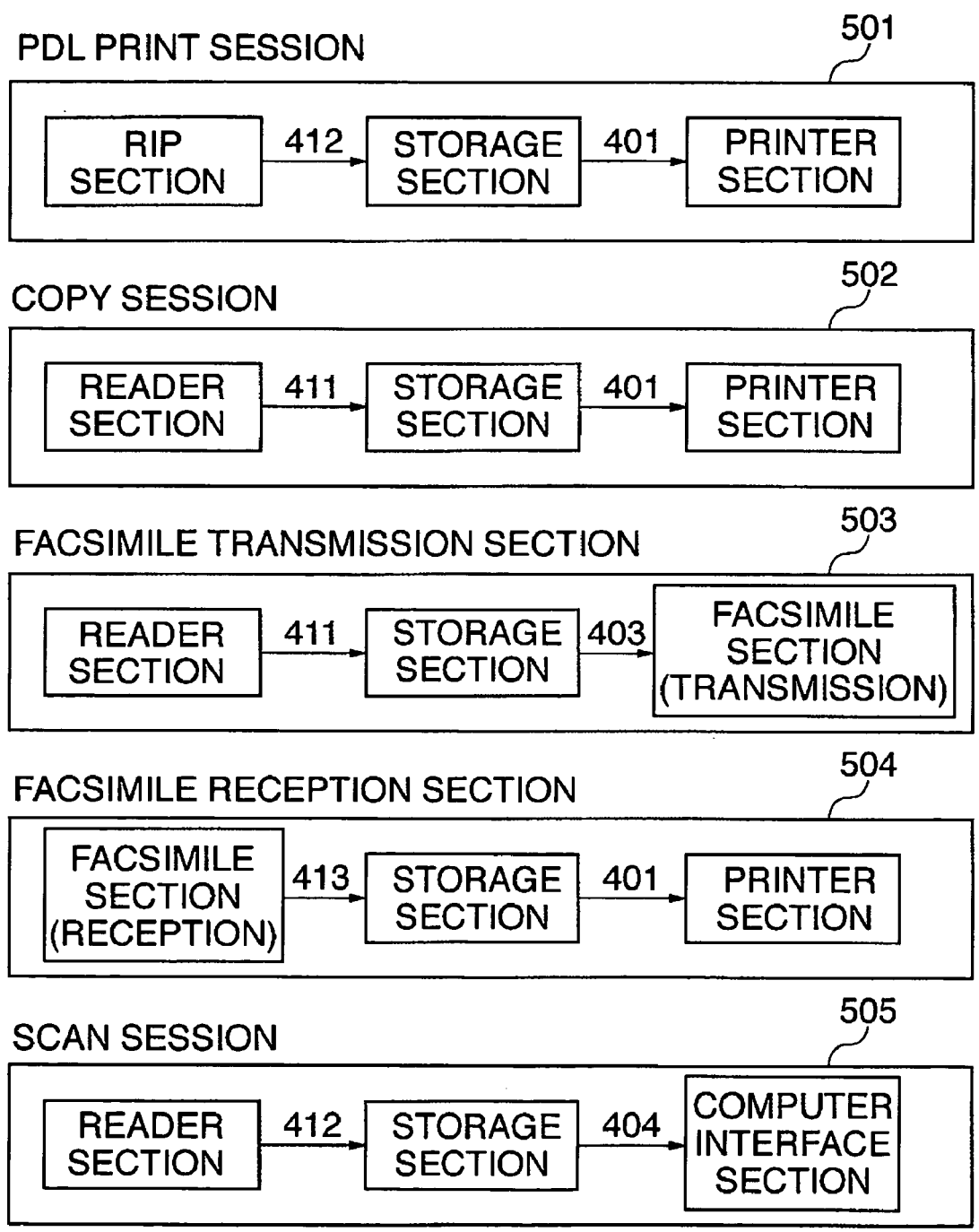
FIG. 5 is a diagram showing a plurality of examples of units in which a plurality of jobs are combined.

FIG. 5 is a diagram showing a plurality of examples of units in which a plurality of jobs are combined. These units in which a plurality of jobs are combined are called "sessions".

In FIG. 5, reference numeral 501 designates a PDL print session and is controlled as a session where the image input job 412 and the image output job 401 are combined. Reference numeral 502 designates a copy session and is controlled as a session where the image input job 411 and the image output job 401 are combined. Reference numeral 503 designates a facsimile transmission session and is controlled as a session where the image input job 411 and the image output job 403 are combined. Reference numeral 504 designates a facsimile reception session and is controlled as a session where the image input job 413 and the image output job 401 are combined. Reference numeral 505 designates a scan session and is controlled as a session where the image input job 411 and the image output job 404 are combined.

It should be noted that a "session" is a control unit including one or more jobs, and as further examples aside from those shown in FIG. 5, the image input job 412 may be treated as a single session, the image output job 401 may be treated as a single session, and a combination of three jobs that are the image input job 412, the image output job 401, and the image output job 403 may be treated as a single session.

Figure 6A:
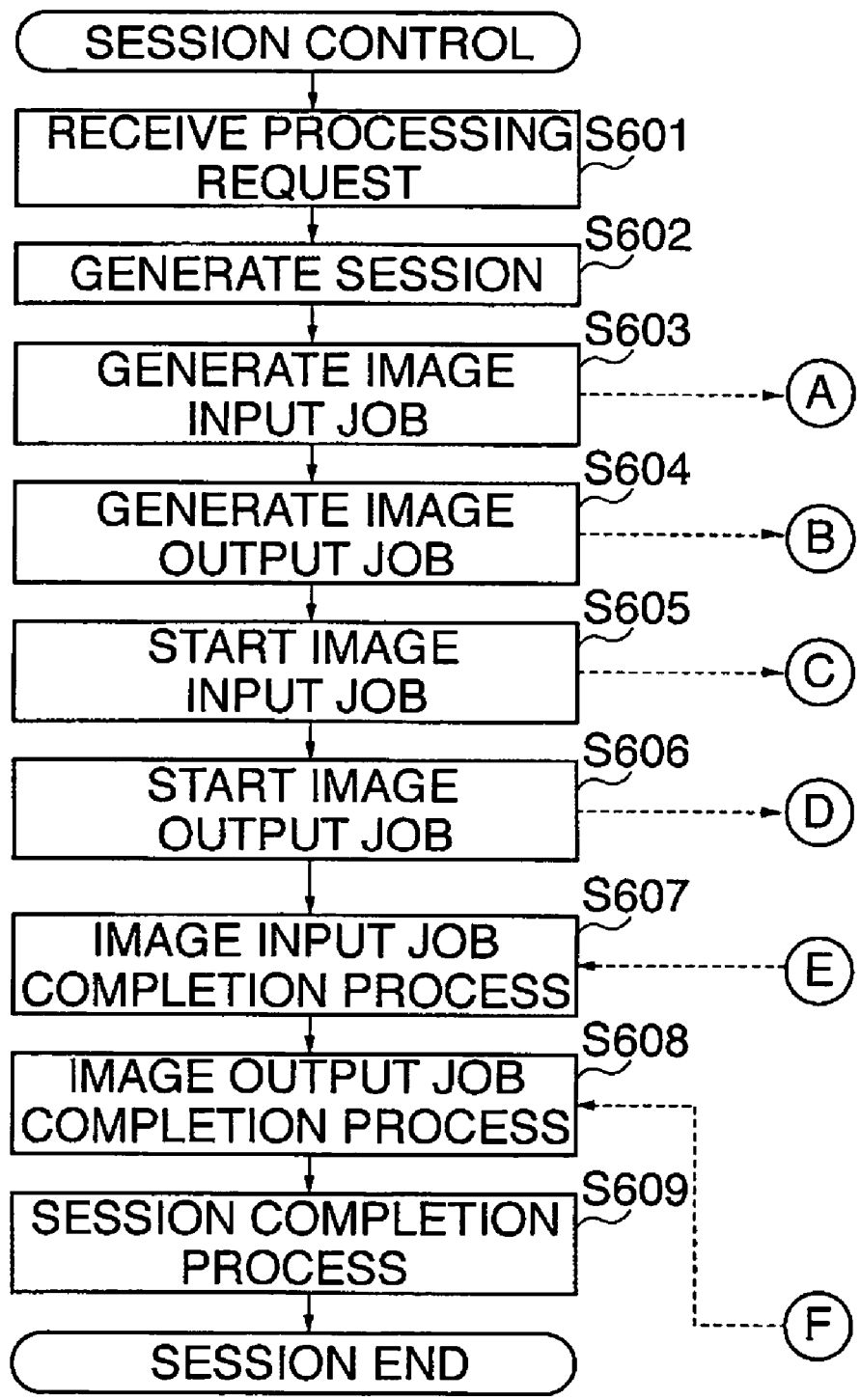
Figure 6B:
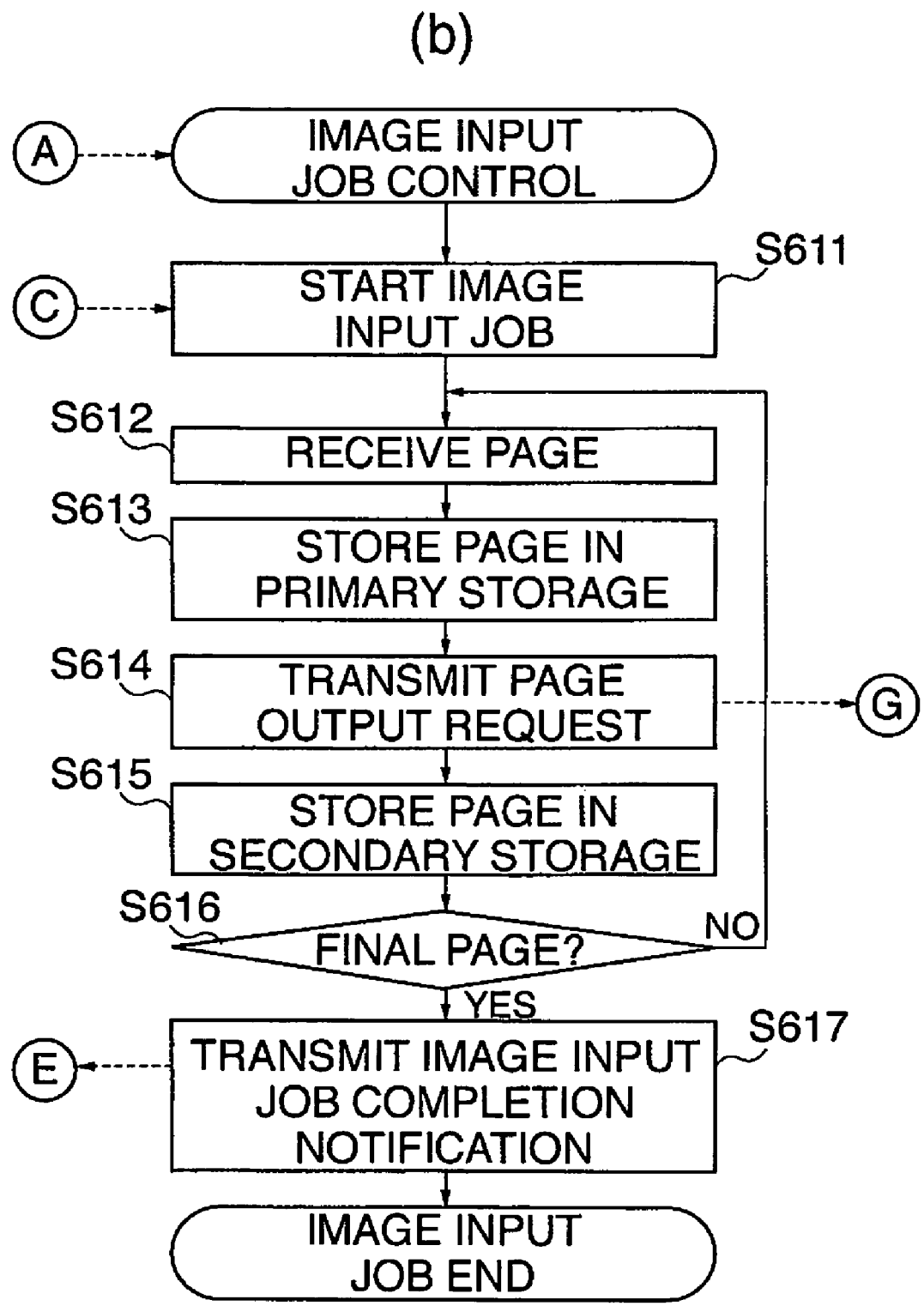

FIGS. 6A to 6C are flowcharts showing the control procedures of the PDL print session 501 shown in FIG. 5 and the image input job 412 and the image output job 401 that compose the PDL print session 501, as one example of the session control and job control procedures carried out by the CPU 123 of the core section 10 when all of the component elements of the MFP are operating normally.

In FIGS. 6A to 6C, reference numerals S601 to S630 designate respective steps and "session control (a)", "image input job (b)" and "image output job (c)" are carried out as separate work units (tasks) to be executed simultaneously in parallel by multitasking while maintaining dependencies therebetween.

First, in the session control (a), the user makes print settings using an input device such as a keyboard and mouse of the PC/WS 11. The print settings can include a number of pages, number of copies, original size, sheet size, zoom ratio, single-sided or double-sided, layout printing, page output order, sort mode, and the like. Here, as one example, the print settings given below are made.

Number of pages: 20 pages (P1)
Number of printed copies: 10 copies (P2)
Single-sided printing: ON (P3)
Original size: A4 (P4)
Sheet size: A4 (P5)
Zoom ratio: 100% (P6)
Layout printing: OFF (P7)
Page output order: Ascending order (P8)
Sort mode: ON (P9)

When the above settings have been made, the user gives a print instruction to the image input/output control section 3 from the PC/WS 11. At the same time, driver software installed on the PC/WS 11 converts the document to be printed to PDL data and transmits the PDL data together with the set print setting parameters (P1) to (P9) via an interface connected to the PC/WS 11 to the network interface section 7.

The PDL data inputted via the network interface section 7 is transferred to the data processing section 121 and then transferred to the RIP section 8 so that the RIP section 8 successively expands (rasterizes) the PDL data to image data. When the RIP section 8 starts to receive the PDL data, a processing request is issued from the RIP section 8 to the core section 10. In the core section 10, the CPU 123 receives the issued processing request (step S601). Here, the print setting parameters (P1) to (P9) set by the user are also transmitted to the CPU 123.

Figure 7:
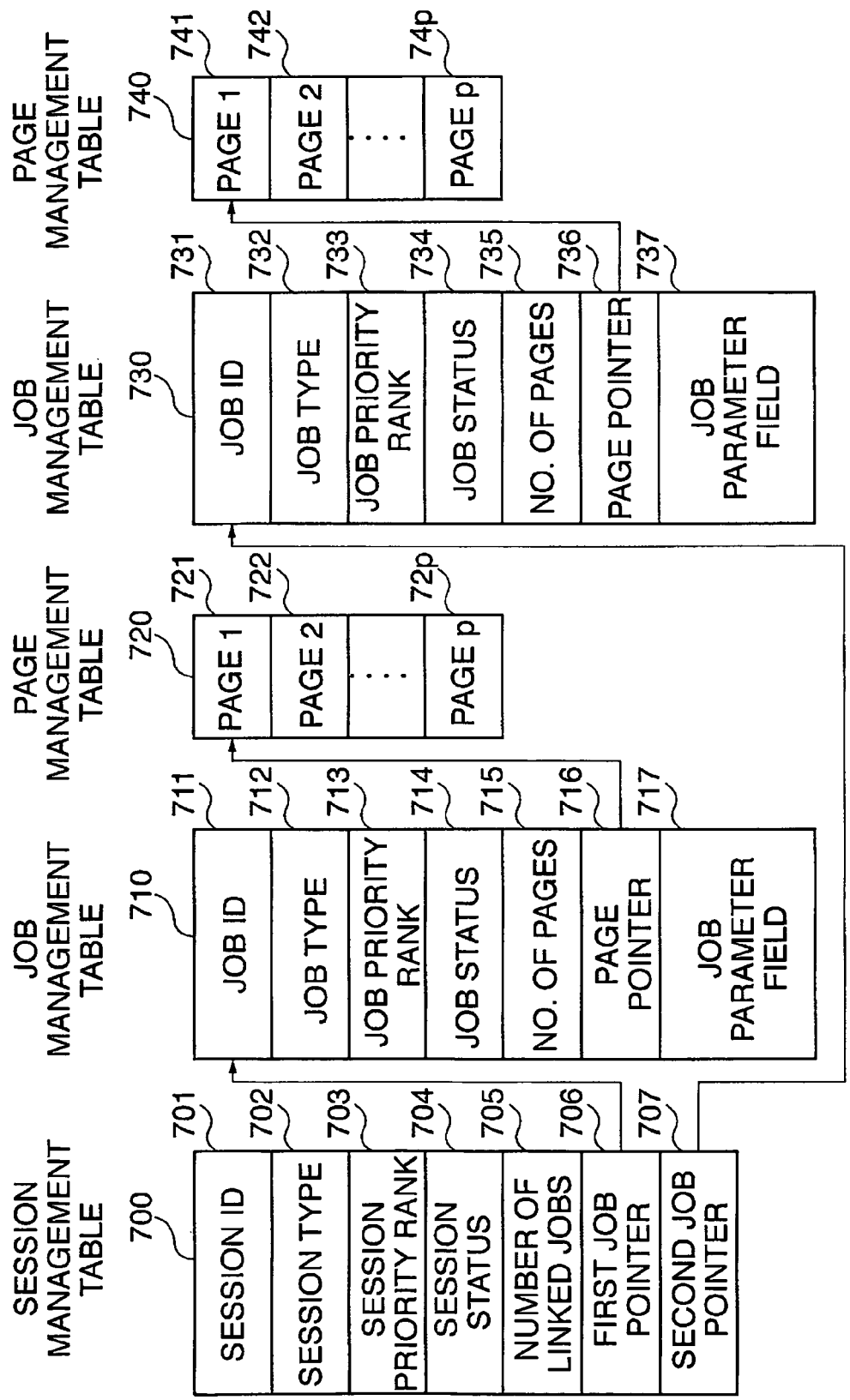
FIG. 7 is a diagram showing a session management table.

Next, in a step S602, the core section 10 divides a single image processing function corresponding to the processing request issued from the RIP section 8 into at least one image input job and/or image output job, generates a session composed of the at least one image input job and/or image output job, and manages the session. FIG. 7 shows a session management table 700. When a session is generated, the session management table 700 shown in FIG. 7 is produced in the memory 124 and a variety of information is stored until the session is completed.

A session ID field 701 stores a generated session ID that is unique within the MFP. A session type field 702 specifies a type of the generated session (such as a PDL print session, copy session, facsimile transmission session, facsimile reception session, or scan session), and in the present operation example, an indication of the PDL print session 501 is recorded therein. A session priority rank field 703 stores a priority rank for the processing order of the present session. A session status field 704 stores an execution state (such as "executable", "mid-execution", "interrupted", "completed", or "error") of the present session. A number of linked jobs field 705 stores the number of image input jobs and image output jobs that compose the present session. In the present operation example, as shown in FIG. 5, the PDL print session 501 is composed of two jobs, i.e., the image input job 412 and the image output job 401, and therefore "2" is set in the number of linked jobs field 705. The first job pointer field 706 is a pointer to a job management table 710 of the image input job 412. The second job pointer field 707 is a pointer to a job management table 730 of the image output job 401. A job pointer field is separately provided for every job that composes the session. A job management table is also separately produced for every job that composes the session.

In a step S603, the job management table 710 of the image input job 412 shown in FIG. 7 is produced in the memory 124 (that is, the image input job 412 is generated) and a variety of information is stored until the job is completed.

A job ID field 711 stores a generated job ID that is unique within the MFP. A job type field 702 specifies a type of the generated job (the image input jobs and image output jobs described above), and in the present operation example, an indication of the image input job 412 where image data expanded by the RIP section 8 is successively recorded in the storage section 5 is recorded therein. A job priority rank field 713 stores a priority rank for the processing order of the present job. A job status field 714 stores an execution state (such as "executable", "mid-execution", "interrupted", "completed", or "error") of the present job. A number of pages field 715 stores a number of pages for the present job. A page pointer field 716 is a pointer to a page management table 720 in which detailed information on the respective pages managed by the present job is written. The page management table 720 is recorded on the hard disk 6.

A job parameter field 717 stores various setting parameters of the present job, and in the present operation example, the settings of the print setting parameters (P1) to (P9) set in the step S601 are stored.

Also, in the session control (a), after the job management table 710 of the image input job described above has been produced, the image input job control (b) is started.

In a step S604, the job management table 730 of the image output job 401 shown in FIG. 7 is produced in the memory (that is, the image output job 401 is generated) and a variety of information is stored until the job is completed.

A job ID field 731 stores a generated job ID that is unique within the MFP. A job type field 732 specifies a type of the generated job (the image input jobs and image output jobs described above), and in the present operation example, an indication of the image output job 401 where image data recorded in the storage section 5 is successively printed out by the printer section 2 is recorded therein. A job priority rank field 733 stores a priority rank for the processing order of the present job. A job status field 734 stores an execution state (such as "executable", "mid-execution", "interrupted", "completed", or "error") of the present job. A number of pages field 735 stores a number of pages for the present job. A page pointer field 736 is a pointer to a page management table 740 in which detailed information on the respective pages managed by the present job is written. The page management table 740 is the same in real data as the page management table 720 recorded on the hard disk 6 for the image input job 412.

A job parameter field 737 stores various setting parameters of the present job, and in the present operation example, the settings of the print setting parameters (P1) to (P9) relating to the number of pages, number of copies, sheet size, zoom ratio, single-sided/double-sided, page output order, sort output, and the like set in the step S601 are stored.

Also, in the session control (a), after the job management table 730 of the image input job described above has been produced, the image output job control (c) is started.

In a step S605, processing of the generated image input job 412 is started. That is, the session control (a) instructs the image input job control (b) to start the job.

In a step S606, the processing of the generated image output job 401 is started. That is, the session control (a) instructs the image output job control (c) to start the job.

In a step S607, the session control (a) receives a job completion notification from the image input job control (b) and carries out a completion process for the image input job. That is, the job status field 714 of the job management table 710 of the image input job is set at "completed".

In a step S608, the session control (a) receives a job completion notification from the image output job control (c) and carries out a completion process for the image output job. That is, the job status field 734 of the job management table 710 of the image output job is set at "completed".

In a step S609, a completion process is executed for the session. That is, the job management tables 710, 730 of the image input job and the image output job and the image data for every page in the page management tables 720, 740 are discarded, the resources used thereby are released, the session management table 700 is also discarded and the resources used thereby are also released.

Next, the image input job control (b) for the PDL print session 501 will be described.

In a step S611, the image input job control (b) receives a job start instruction from the session control (a) and if the image input job control (b) is in a state where no other job is being executed and a new image input job can be received, processing of the designated job is started.

In a step S612, one page (in a first iteration of the step S612, "page 1") of the image data expanded by the RIP section 8 is received. That is, image transfer is carried out from the RIP section 8 to the data processing section 121 via the interface 120.

In a step S613, the image data transferred to the data processing section 121 is temporarily stored in the page memory 125.

In a step S614, a page output request is transmitted to the image output job control (c). When reading of the image data for the present page from the page memory 125 is completed by the image output job control (c) described later, the processing proceeds to a step S615.

In the step S615, the image data temporarily stored in the page memory 125 is recorded in the hard disk 6 of the storage section 5. At this time, various image attribute information (resolution, number of pixels, and the like) is recorded in a "page 1" field 721 in the page management table 720.

In a step S616, it is determined whether all of the pages to be processed that have been expanded by the RIP section 8 have been recorded in the hard disk 6 as image data. If a result of the determination is that pages that have not been processed remain, the processing returns to the step S612, while when all of the pages have been processed, the processing proceeds to a step S617.

In the step S617, a completion notification for the image input job is transmitted to the session control (a) and the image input job control (b) is terminated. By doing so, the job status field 714 of the job management table 710 of the image input job is set at "completed".

Next, the image output job control (c) for the PDL print session 501 will be described.

In a step S621, the image output job control (c) receives a job start instruction from the session control (a) and if the printer section 2 is not being used by another job and is in a state where a new print operation can be carried out, the designated job is started.

In a step S622, the output request for the image data temporarily stored in the page memory 125 is received from the image input job control (b).

In a step S623, reading of the image data from the page memory 125 is started.

In a step S624, after right of use for the printer section 2 is obtained, an output path in the MFP is set based on the output parameters (P1) to (P9) set in the job parameter field 737. Here, assume that the path is set at the upper cassette 204→the sheet feeding rollers 211→the sheet feeding rollers 213 the photosensitive drum 202 the fixing section 207→the discharge rollers 208→the finisher 220. Image data of the read page is transferred to the printer section 2 via the interface 122 and image formation is carried out by the printer section 2 as described above to print out the image data.

In a step S625, it is determined whether the page output request from the image input job control (b) is for the final page. If a result of the determination is that pages that have not been processed remain, the processing returns to the step S622, while when all of the pages have been processed, the processing proceeds to a step S626. In the processing up to this point, the printing of a first copy out of the number of copies (here, 10) set by the parameter (P1) is completed. At this stage, a stapling process may be carried out for the print-out sheets as necessary.

In the step S626, the image data for respective pages recorded in the hard disk 6 of the storage section 5 in step S615 of the image input job control (b) is successively read out and is transferred to the data processing section 121 via the interface 120. In the data processing section 121, image data of one page that has been transferred is stored in the page memory 125.

In a step S627, after right of use for the printer section 2 is obtained, the image data that has been transferred to the data processing section 121 and stored in the page memory 125 is transferred to the printer section 2 via the interface 122 and image formation is carried out by the printer section 2 to print out the image data.

In a step S628, it is determined whether the image data for all of the respective pages recorded in the hard disk 6 has been printed out. If a result of the determination is that pages that have not been processed remain, the processing returns to the step S626, while when all of the pages have been processed, since stapling has been designated, the printer section 2 staples together the sheets of one copy, and the processing proceeds to a step S629.

In the step S629, it is determined whether the number of printed copies set in the step S601 has been printed out. If a result of the determination is that copies that have not been processed remain, the processing returns to the step S626, the image data is read from the hard disk 6, stored in the page memory 125, and is printed out by the printer section 2. On the other hand, when all of the copies have been processed, the processing proceeds to a step S630.

In a step S630, a completion notification for the image output job is transmitted to the session control (a) and the image output job control (c) is terminated. By doing so, the job status field 734 of the job management table 730 of the image output job is set at "completed".

The above example describes the PDL print session 501 where according to the print settings made on the PC/WS 11, control is carried out to transfer image information from the PC/WS 11 as PDL data, and to expand the PDL data to image data and print out the image data at the MFP. Such control can be applied in the same way to the copy session 502 shown in FIG. 7 that prints out image information read by the reader section 1.

Control procedures of the copy session 502 shown in FIG. 5, and the image input job 411 which successively records image data read by the reader section 1 in the storage section 5, and the image output job 401 where image data recorded in the storage section 5 is successively printed out by the printer section 2, that compose the copy session 502, will now be described with reference to FIGS. 6A to 6C as a second example of session control and job control.

First, in the session control (a), the user makes various settings for a copy operation on the operating section 9 of the image input/output control section 3.

Figure 8:
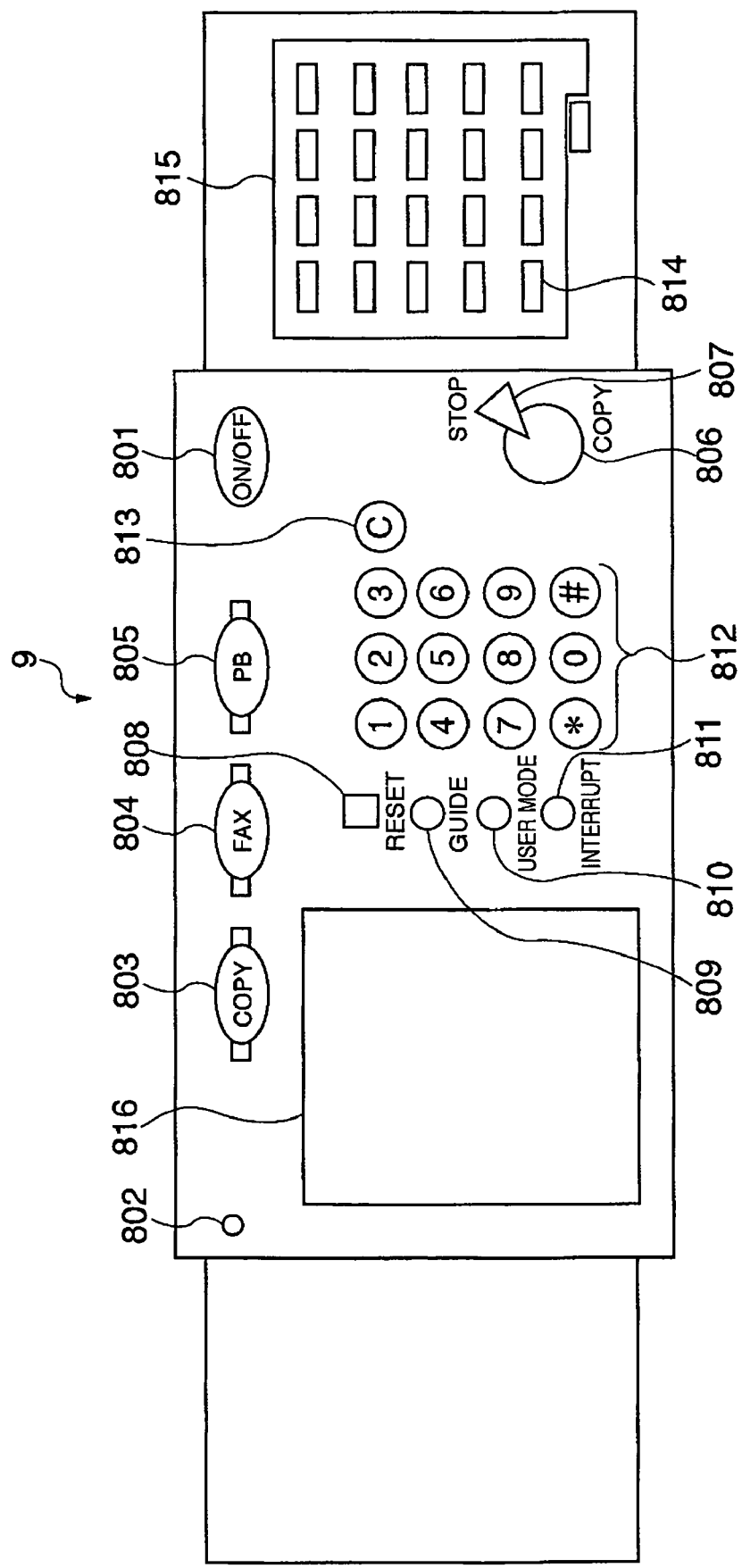
FIG. 8 is a view showing the appearance of an operating section.

FIG. 8 is a view showing the appearance of the operating section 9. Here, the operating section 9 includes a power key 801, a warm-up key 802, a copy function selection key 803, a facsimile function selection key 804, a personal box function selection key 805, a start key 806, a stop key 807, a reset key 808, an operation guide key 809, a user mode setting key 810, an interrupt copy key 811, a ten key 812, a clear key 813, facsimile one-touch keys 814, a one-touch key switching cover 815, and a touch panel 816.

The various settings for a copy operation include a number of copies, sheet size, zoom ratio, single-sided/double-sided, sort output, and the like, and are inputted by the user according to setting items displayed on the touch panel 816 and a press of the ten key 812. Here, as one example, the copy settings given below are made.

Number of copies: 10 copies (C1)
Single-sided printing: ON (C2)

Copy sheet size: A4 (C3)
Zoom ratio: 100% (C4)
Layout printing: OFF (C5)
Sort mode: ON (C6)
Stapling: ON (C7)

When the copy settings have been made, the user places an original on the reader section 1 and gives a copy instruction by pressing the start key 806. The operating section 9 transfers a process request to the CPU 123 of the core section 10 together with the set copy setting parameters (C1) to (C7), and the process request and parameters are received by the CPU 123 (the step S601).

Next, in the step S602, the core section 10 divides a single image processing function corresponding to the processing request issued from the operating section 9 into at least one image input job and/or image output job, generates a session composed of the at least one image input job and/or image output job, and manages the session using the session management table 700 in FIG. 7 described above so that a variety of information is stored until the session is completed.

In the step S603, the job management table 710 of the image input job 411 is produced in the memory 124 (that is, the image input job 411 is generated) and a variety of information is stored until the job is completed. Here, the job parameter field 717 shown in FIG. 7 stores various setting parameters of the present job, and in the present operation example, the settings of the copy setting parameters (C1) to (C7) set in the step S601 are stored.

Also, in the session control (a), after the job management table 710 of the image input job described above has been produced, the image input job control (b) is started.

In the step S604, the job management table 730 of the image output job 401 is produced in the memory 124 and a variety of information is stored until the job is completed. The job parameter field 737 stores various setting parameters of the present job, and in the present operation example, the settings of the parameters (C1) to (C7) relating to the number of copies, sheet size, zoom ratio, single-sided/double-sided, sort output, stapling ON/OFF and the like set in the step S601 are stored.

Also, in the session control (a), after the job management table 730 of the image output job described above has been produced, the image output job control (c) is started.

In the step S605, processing of the generated image input job 411 is started. That is, the session control (a) instructs the image input job control (b) to start the job.

In the step S606, processing of the generated image output job 401 is started. That is, the session control (a) instructs the image output job control (c) to start the job.

In the step S607, the session control (a) receives a job completion notification from the image input job control (b) and carries out a completion process for the image input job. That is, the job status field 714 of the job management table 710 of the image input job is set at "completed".

In the step S608, the session control (a) receives a job completion notification from the image output job control (c) and carries out a completion process for the image output job. That is, the job status field 734 of the job management table 710 of the image output job is set at "completed".

In the step S609, a completion process is executed for the session. That is, the job management tables 710, 730 for the image input job and the image output job and the image data for every page in the page management tables 720, 740 are discarded, the resources used thereby are released, the session management table 700 is also discarded and the resources used thereby are also released.

Next, the image input job control (b) for the copy session 502 will be described.

In the step S611, the image input job control (b) receives a job start instruction from the session control (a) and if the reader section 1 is not being used by another image input job and a new image input job can be received, processing of the designated job is started. After right of use for the reader section 1 is obtained, an input path in the MFP is set based on the output parameters (P1) to (P9) set in the job parameter field 737. Here, assume that the path is set at the original feeding apparatus 101→the platen glass 102→the discharge tray.

In the step S612, one page (in a first iteration of the step S612, "page 1") of the image data read by the reader section 1 is received. That is, image transfer is carried out from the reader section 1 to the data processing section 121 via the interface 120.

In the step S613, the image data transferred to the data processing section 121 is temporarily stored in the page memory 125.

In the step S614, a page output request is outputted to the image output job control (c). When reading of the image data for the present page from the page memory 125 is completed by the image output job control (c), the processing proceeds to the step S615.

In the step S615, the image data temporarily stored in the page memory 125 is recorded in the hard disk 6 of the storage section 5. At this time, various image attribute information (resolution, number of pixels, and the like) is recorded in the "page 1" field 721 in the page management table 720.

In the step S616, it is determined whether all of the pages to be processed that have been read by the reader section 1 have been recorded in the hard disk 6 as image data. When a determination result is that pages that have not been processed remain, the processing returns to the step S612, while when all of the pages have been processed, the processing proceeds to the step S617.

In the step S617, a completion notification for the image input job is transmitted to the session control (a) and the image input job control (b) is terminated. By doing so, the job status field 714 of the job management table 710 of the image input job is set at "completed".

The processing from step S621 onward in the image output job control (c) for the copy session 502 is exactly the same as for the PDL print session 501 described above, and therefore description thereof is omitted.

Although the control procedure for the PDL print session 501 and the copy session 502 has been described in the above examples, the control procedure described above can be applied in the same way to any session regardless of how image input jobs and image output jobs are combined to compose the session.

Next, error control for the MFP will be described.

The input/output media of the reader section 1 and the printer section 2 are made of paper, and in some cases, due to a variety of factors, paper sheets may not be discharged as normal and become jammed.

The MFP manages a standard procedure and time period required for recovery as management data in the memory 124, and when a jam occurs, a recovery procedure is displayed on the operating section 9 using the management data in accordance with the position where the jam occurred.

Also, to prevent the printer section 2 from stopping due to an error, it is possible to set a replacement path priority mode. The replacement path priority mode switches, when there is a path that bypasses the position where the jam has occurred, to a bypass path to prioritize continued execution of the session without operations of the reader section 1 and/or the printer section 2 stopping. In particular, in the replacement path priority mode, when an error has occurred, a standard recovery time period until recovery obtained by the operating section 9 from the management data is displayed and an estimated recovery time period until recovery inputted by the user using the operating section 9 is received.

By doing so, it is possible to set an estimated recovery time period that is shorter than the standard recovery time period required until recovery, and since processing can be carried out until recovery based on the set estimated recovery time period, it is possible to shorten a stopped time period of the reader section 1 and/or the printer section 2 in accordance with the position of the error.

In the step S611 in the control procedure of the copy session 502, when a jam has occurred due to deterioration over time (secular change) of a sheet-feeding roller or the like in the original feeding apparatus 101 of the reader section 1, the CPU 123 of the core section 10 checks the input path information stored in the memory 124. Although it is not possible to set a replacement path in the original feeding apparatus 101 of the present MFP, when a replacement path is available, in addition to displaying the standard recovery time period until recovery and the recovery procedure on the operation section 9 based on the management data, if the replacement path priority mode has been set, the processing immediately switches to the replacement path.

When a jam has occurred due to deterioration over time of a sheet-feeding roller or the like in the original feeding apparatus 101, so long as there are no problems with the printer section 2, it is possible to interrupt the copy session 502 and to start another PDL session as an interrupt session. If the error is minor, even if the replacement path priority mode has not been set, by inputting an estimated recovery time period until recovery that is shorter than the standard recovery time period via the operating section 9 and quickly completing the recovery, the session can be continued with the operation of the printer section 2 hardly stopping.

When a sheet feeding jam has occurred for the sheet-feeding rollers 211 in the step S621 onward in the image output job control (c) in the PDL print session 501 or the copy session 502 and the replacement path priority mode has been set, the CPU 123 of the core section 10 searches for a bypass path in the printer section 2, switches to a bypass path that uses the sheet-feeding roller 212, and continues executing the session.

When a paper jam has occurred so that conveying of a recording medium by a conveying member such as the sheet-feeding rollers 213, the photosensitive drum 202, the fixing section 207, and the discharge rollers 208 is not possible and the replacement path priority mode has been set, there is no bypass path, and therefore the standard recovery time period until recovery and the recovery procedure are displayed on the operating section 9 based on the management data, and so long as there are no problems with the reader section 1, it is possible to interrupt the PDL print session 501 and to start a reading-in operation of another copy session as an interrupt session.

When a discharge jam has occurred at the finisher 220, if the replacement path priority mode has been set, the CPU 123 of the core section 10 searches for a bypass path inside the finisher 220 and if a finishing process such as stapling has not been set in the parameters, the CPU 123 switches to a bypass path that leads to an escape tray 261, and continues executing the session.

Figure 9:
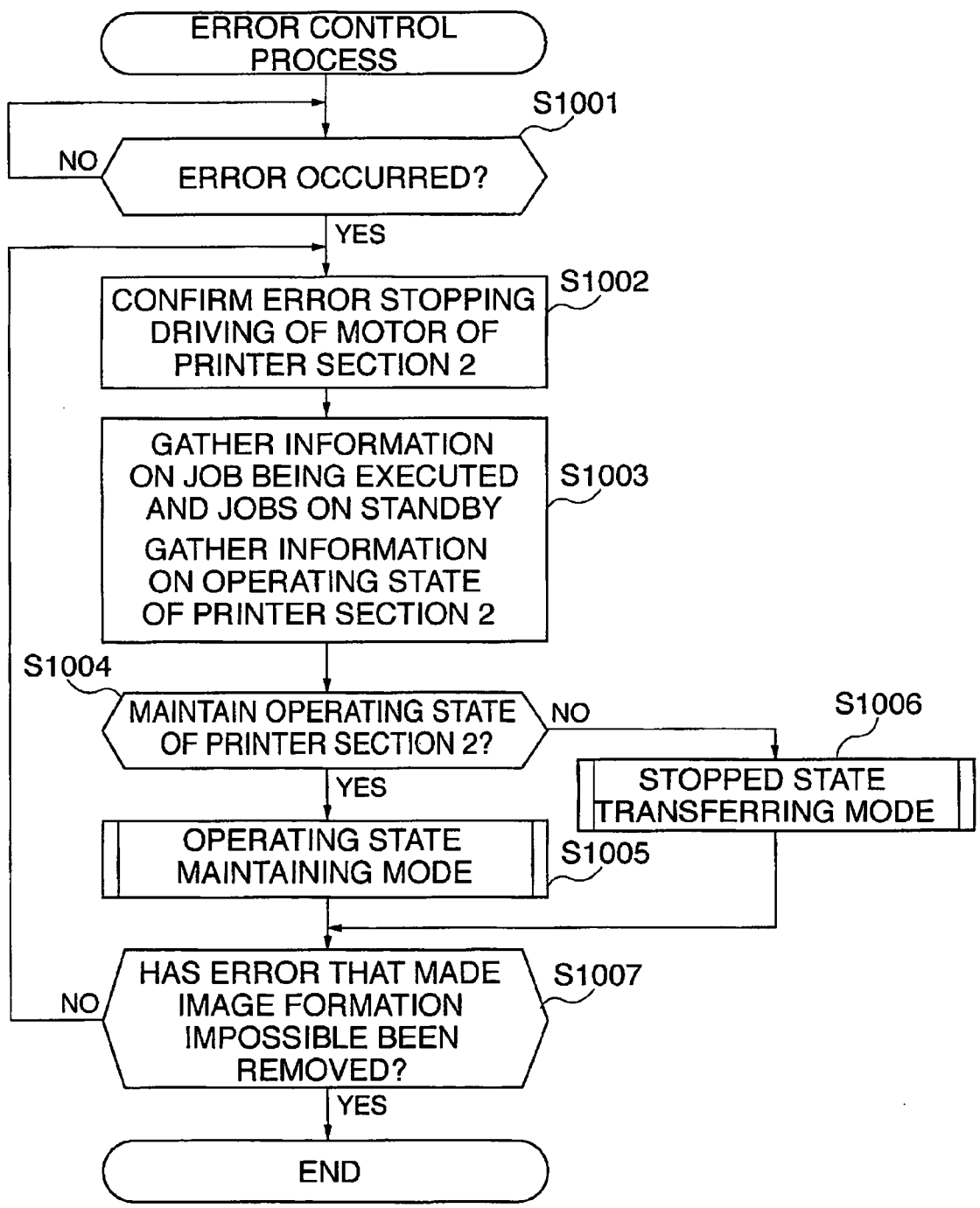
FIG. 9 is a flowchart showing the procedure of an error control process executed by the CPU of the core section.

FIG. 9 is a flowchart showing the procedure of an error control process executed by the CPU 123 of the core section 10.

First, the CPU 123 determines whether an error that prevents image formation from being executed has occurred in the MFP (image forming apparatus) (step S1001) When an error has occurred in the MFP, the CPU 123 checks whether the error causes the driving of the motor of the printer section 2 to stop (step S1002). Here, an error that causes the driving of the motor of the printer section 2 to stop is an error where the driving of the motor of the printer section 2 cannot be maintained. For example, when a discharge jam (paper jam) has occurred in the finisher 220, since the driving of the motor of the printer section 2 can be maintained, such error does not cause the driving of the motor of the printer section 2 to stop. In addition, when the remaining amount of sheets stored in the upper cassette 204 is a predetermined amount or less (for example, 10% or 0% of full capacity), although execution of image formation by the printer section 2 may not be possible, it is possible to maintain the driving of the motor of the printer section 2. On the other hand, when a discharge jam (paper jam) occurs on the conveying path that conveys a sheet, for example, it is not possible to maintain the driving of the motor of the printer section 2, and therefore such error causes the driving of the motor of the printer section 2 to stop.

Next, the CPU 123 gathers information on the job being executed and jobs on standby, and also gathers information on the operating state of the printer section 2 (step S1003). The operating state of the printer section 2 refers to an operating state of the motor driving control section 12 that drives the motor rotating the various sheet feeding rollers, the photosensitive drum, and the like provided in the printer section 2. In the step S1003, information is gathered on the job being executed and the jobs on standby since if the jobs on standby include a job of a different type to the job being executed, it may be possible to process such job before the job presently being executed. Information is gathered on the operating state of the printer section 2 to determine whether the motor driving control section 12 can drive the printer section 2 after the error has occurred.

Next, it is determined whether the driving state of the printer section 2 can be maintained (step S1004). In this determination, a screen shown in FIG. 10A is displayed on the operating section 9, and when a "maintain" button has been pressed, the processing proceeds to operating state maintaining mode in a step S1005 described later. On the other hand, when the "stop" button has been pressed, the processing proceeds to a stopped state transferring mode in a step S1006 described later.

When the operating state maintaining mode is set in the step S1004, that is, when the "maintain" button has been pressed on the display screen shown in FIG. 10A, the operating state maintaining mode described later is executed (step S1005). In this case, a display screen shown in FIG. 10B is displayed on the operating section 9 and when an "OK" button is pressed, the operating state maintaining mode is executed. Conversely, when a "return" button is pressed, the display screen shown in FIG. 10A is displayed again on the operating section 9.

In the step S1004, when the operating state maintaining mode is not set, that is, when the "stop" button has been pressed on the display screen shown in FIG. 10A, the stopped state transferring mode described later is executed (step S1006). The stopped state transferring mode is a process that causes the printer section 2 to transfer from the operating state to the stopped state. In this case, a display screen shown in FIG. 10C is displayed on the operating section 9 and when an "OK" button is pressed, the stopped state transferring mode is executed. Conversely, when a "return" button is pressed, the display screen shown in FIG. 10A is displayed again on the operating section 9. The stopped state transferring mode executes the stopped state transferring process mentioned above when the display screen shown in FIG. 10B is displayed and the "OK" button has been pressed.

After the step S1005 or the step S1006 is completed, the CPU 123 determines whether the error that prevents execution of image formation by the MFP has been removed (step S1007). When the error has been removed, the present processing is terminated, but when the error has not been removed, the processing returns to the step S1002.

It should be noted that although the replacement path priority mode described above is included in the operating state maintaining mode, the operation mode maintaining mode aside from the replacement path prioritizing mode will now be described.

Figure 11:
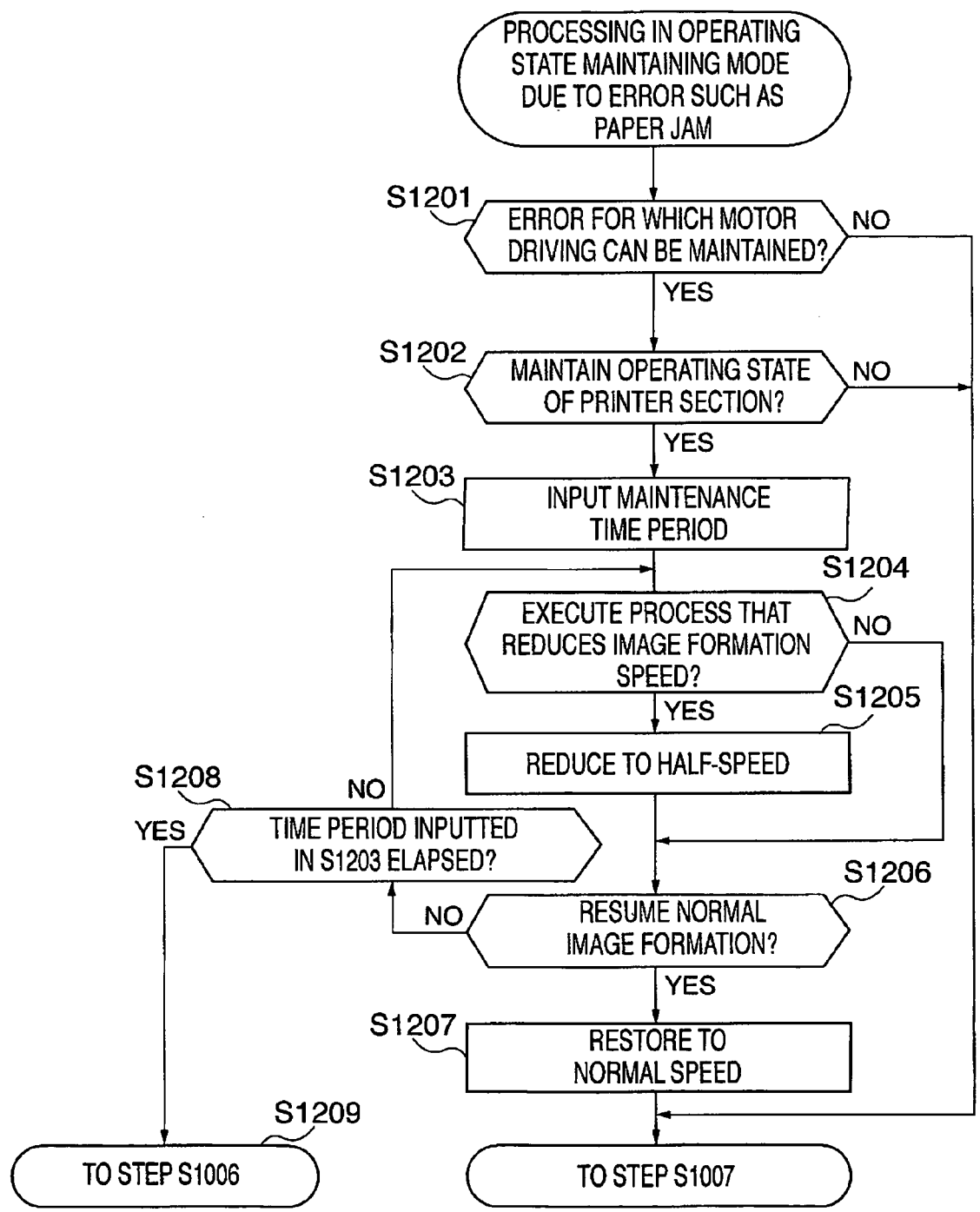
FIG. 11 is a flowchart showing the procedure when an operating state maintaining mode has been set due to an error, such as a paper jam.

FIG. 11 is a flowchart showing the procedure when the operating state maintaining mode is set due to an error, such as a jam on a conveying path that conveys a sheet, that prevents image formation from being executed by the MFP. This process in executed by the CPU 123 of the core section 10.

First, the CPU 123 determines whether the error found in the step S1002 is an error for which the driving of the motor of the printer section 2 can be maintained (step S1201). When the driving of the motor of the printer section 2 can be maintained for the error, the operating section 9 displays a display screen shown in FIG. 12A, for example, while when the driving of the motor of the printer section 2 cannot be maintained for the error, the operating section 9 displays a display screen shown in FIG. 12B, for example.

When the result of the determination in the step S1201 is that the driving of the motor of the printer section 2 cannot be maintained for the error, that is, when an "OK" button has been pressed in the display screen shown in FIG. 12B, the processing proceeds to the step S1007 in FIG. 9.

On the other hand, when the result of the determination in the step S1201 is that the driving of the motor of the printer section 2 can be maintained for the error, that is, when an "OK" button has been pressed in the display screen shown in FIG. 12A, it is determined whether the operating state of the printer section 2 (a state where the photosensitive drum 202 is rotated) is to be maintained (step S1202). At this time, the operating section 9 displays a display screen shown in FIG. 12C, for example. In the display screen shown in FIG. 12C, when a "maintain" button has been pressed, it is determined that the operating state of the printer section 2 is to be maintained, while when a "stop" button has been pressed, it is determined to execute the stopped state transferring process.

When, as a result of the determination in step S1202, it is determined to execute the stopped state transferring process, the processing proceeds to the step S1007 in FIG. 9. On the other hand, when as the result of the determination in step S1202, it is determined that the operating state of the printer section 2 is to be maintained, input of an elapsed time period, i.e., a maintenance time period required to remove the error is awaited (step S1203). This maintenance time period is a value inputted by the operator of the MFP via the operating section 9 with consideration to the approximate time period required to remove the error. At this time, a display screen shown in FIG. 12D, for example, is displayed on the operating section 9. In the display screen shown in FIG. 12D, the maintenance time period is inputted into a blank (the time period required to remove the error starting from when the error occurred), and when an "OK" button is pressed, the maintenance time period is set in the CPU 123. When a "clear" button is pressed, the maintenance time period inputted into the blank is deleted. It should be noted that although it is assumed that the maintenance time period is inputted by the operator in the step S1203, a value stored in advance in the storage section 5 or the like of the MFP may be automatically inputted. In this case, a plurality of different maintenance time periods may be stored in advance in the storage section 5 for different types of error (a jam for a sheet in a sheet-feeding section, a jam for a sheet in the discharge section, a lack of sheets, a lack of toner, and the like), and in the step S1203, a maintenance time period read from the storage section 5 based on the error found in step S1002 in FIG. 9 may be inputted.

Next, it is determined whether a process that reduces the image formation speed in accordance with the set maintenance time period is to be executed (step S1204).

When the result of the determination in the step S1204 is that the process that reduces the image formation speed is to be executed, the image formation speed is reduced to half the normal image formation speed, for example (step S1205), the operating section 9 displays a display screen shown in FIG. 12E, for example, and the processing proceeds to a step S1206. On the other hand, when the process that reduces the image formation speed is not to be executed, the step S1205 is skipped and the processing proceeds to the step S1206. It should be noted that the process that reduces the image formation speed can only be executed for certain types of error. One example of such an error is when the remaining amount of sheets stored in the upper cassette 204 falls below 10% of the sheet capacity of the upper cassette 204 during execution of a job that designates feeding of sheets from the upper cassette 204. In the case of an error, such as a sheet jam, for which it is not possible to execute the process that reduces the image formation speed, the processing proceeds to a step S1206 without displaying the display screen shown in FIG. 12E. The image formation speed may also be decided based on the maintenance time period inputted in the step S1203. For example, when the remaining amount of sheets stored in the upper cassette 204 is 10% of the sheet capacity of the upper cassette 204, the image formation speed may be decided so that the number of sheets equivalent to 10% of the sheet capacity are not used up until the inputted maintenance time period elapses.

Next, it is determined whether the error has been removed and image formation by the printer section 2 can be resumed (the step S1206). If the image formation cannot be resumed, the processing proceeds to a step S1208, while if image formation can be resumed, the image formation speed reduced in the step S1205 is restored to the normal image formation speed (step S1207), and then the processing proceeds to the step S1007 in FIG. 9. In the step S1207, a display screen shown in FIG. 12F is displayed by the operating section 9, for example.

In the step S1208, the CPU 123 determines whether the maintenance time period inputted in the step S1203 has elapsed. If the maintenance time period has not elapsed, the processing returns to the step S1204, while if the maintenance time period has elapsed, the processing proceeds to a step S1209.

In the step S1209, since it is not possible to carry out image formation even though maintenance time period inputted in the step S1203 has elapsed, the CPU 123 executes the stopped state transferring process (that is, a transfer to the stopped state transferring mode in the step S1006) to cause the printer section 2 to transfer from the operating state to the stopped state. It should be noted that although the step S1209 is not executed unless the maintenance time period inputted in the step S1203 has elapsed, another method may be used. For example, when the maintenance time period inputted in the step S1203 is longer than a total (T1+T2) of a stopped state transferring time (T1) required by the stopped state transferring process and an operating state transferring time (T2) required by the operating state transferring process, the stopped state transferring process may be executed after the step S1203. In this case, by starting the operating state transferring process in timing that is T2 earlier than the timing in which the maintenance time period has elapsed, it is possible to have the printer section 2 transfer to the operating state before the maintenance time period elapses. The time periods T1 and T2 may be stored in advance in the storage section 5 or the like, or may be calculated based on the operating state of the printer section 2 when the step S1203 is executed.

Next, warning control of the MFP will be described.

When the printer section 2 is constructed to use the electrophotographic technique, toner is used as the medium for forming images. In the same way, staples are used when a stapler that can staple together a plurality of recording sheets as a finishing process is provided. When the amount of consumables such as toner, recording sheets, and staples is equal to or lower than a predetermined amount in a session and in particular in the image output job control (c), refilling of the consumables needs to be carried out.

In the processing from step S621 onward in the image output job control (c) of the PDL print session 501 or the copy session 502, if the sheet stacking amount sensors 251, 252 detect that the amount of sheets stacked on the upper cassette 204 and the lower cassette 205 is a predetermined amount or less, if the toner amount sensor 250 detects that the amount of toner is a predetermined amount or less, or if the staple loading amount sensor 253 detects that the amount of staples is a predetermined amount or less, the CPU 123 of the core section 10 displays the standard recovery time until recovery and the recovery procedure based on the management data on the operating section 9 as a warning, and the maintenance time period until recovery inputted by the user via the operating section 9 is received. By doing so, it is possible to set a maintenance time period that is shorter than the standard recovery time period required until recovery, and since it is possible to carry out processing until recovery based on the maintenance time period (the process that reduces the image formation speed), it is possible to reduce the stopped time period of the printer section 2 according to a content of the warning.

On the other hand, when the warning has not been cleared after a predetermined proportion (for example, 50%) of the standard recovery time period has elapsed following a start of display of the standard recovery time period, if the operating state maintaining mode is set, the process that reduces the image formation speed is executed. Alternatively, regardless of the standard recovery time period, the process that reduces the image formation speed may be executed after a predetermined time period. The process that reduces the image formation speed may increase the interval (time interval) for feeding recording sheets from the upper cassette 204 or the lower cassette 205 in the printer section 2, by doubling for example, so that it is possible to reduce the consumed amount of sheets, the amount of which has fallen to a predetermined amount or less, to half the normal amount. If after the process that reduces the image formation speed has been executed, toner, sheets, or staples are refilled and the CPU 123 of the core section 10 identifies that the warning has been cleared, the core section 10 can carry out control over the printer section 2 to return to the normal sheet-feeding interval to return to the normal mode.

However, when the printer section 2 unavoidably needs to be stopped to refill the toner in the processing from step S621 onward in the image output job control (c) of the PDL print session 501 or the copy session 502, if another copy session (i.e., an interrupt copy session) is reserved for the core section 10, the reader section 1 is caused to start the image reading operation of such copy session as an interrupt session. When after this, the CPU 123 of the core section 10 identifies that the warning has been cleared, if it is possible for the PDL print session 501 and the copy session 502 that is the interrupt session to operate in parallel, image reading of the (interrupt) copy session 502 is carried out by the reader section 1 and the image output job of the restored PDL print session 501 is carried out by the printer section 2. By carrying out the same control for other consumables, it is possible to continuously execute sessions without a fall in the productivity of the reader section 1 and/or the printer section 2 during a period from the warning to the recovery (i.e., when the consumables are refilled).

Figure 13:
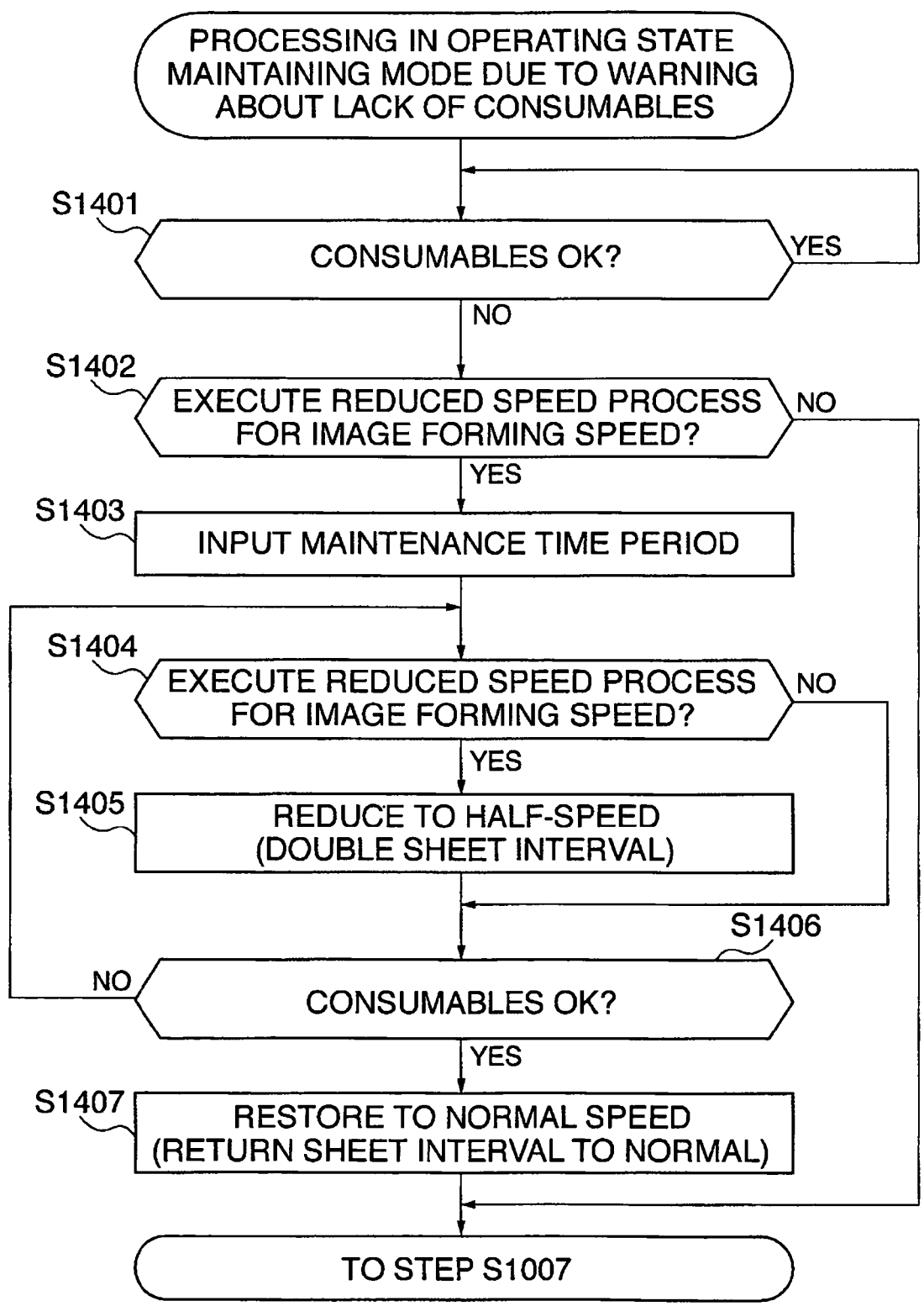
FIG. 13 is a flowchart showing the procedure in a case where operating state maintaining mode is set due to a warning about a lack of consumables (such as sheets, toner, or staples)

FIG. 13 is a flowchart showing the procedure when the operating state maintaining mode is set due to a warning about a lack of consumables (such as sheets, toner, or staples). This procedure is carried out by the CPU 123 of the core section 10.

First, it is determined whether a warning about a lack of consumables has occurred (step S1401). More specifically, when a signal notifying that the amount of sheets is a predetermined amount or less has been received from the sheet stacking amount sensors 251, 252, a signal notifying that the amount of toner is a predetermined amount or less has been received from the toner amount sensor 250, or a signal notifying that the amount of staples is a predetermined amount or less has been received from the staple loading amount sensor 253, it is determined that a warning about a lack of consumables (such as sheets, toner, or staples) has occurred. When the amount of sheets is a predetermined amount or less, a warning display shown in FIG. 14A, for example, is displayed on the operating section 9.

When a lack of consumables has occurred, it is determined whether to execute the process that reduces the image formation speed (step S1402). At this time, a display screen shown in FIG. 14B, for example, is displayed on the operating section 9. In the display screen shown in FIG. 14B, when a "permit" button has been pressed, it is determined to execute the process that reduces the image formation speed, while when an "inhibit" button has been pressed, it is determined not to execute the process that reduces the image formation speed.

When it has been determined in the step S1402 not to execute the process that reduces the image formation speed, the processing proceeds to a step S1007 in FIG. 9, while when the process that reduces the image formation speed is carried out, input of the maintenance time period is awaited (step S1403). At this time, a display screen shown in FIG. 14C, for example, is displayed on the operating section 9. In the display screen shown in FIG. 14C, by inputting the maintenance time period into a blank and pressing an "OK" button, the maintenance time period is set in the CPU 123. When a "clear" button is pressed, the maintenance time period inputted into the blank is deleted.

Next, the CPU 123 determines whether to execute the process that reduces the image formation speed in accordance with the maintenance time period set in the step S1403 (step S1404). When it is determined to execute the process that reduces the image formation speed in accordance with the maintenance time period, the sheet feeding speed is reduced to half-speed or the time interval between the feeding of sheets from the upper cassette 204 or the lower cassette 205 is increased, by doubling for example, so that the consumed amount of sheets, a predetermined amount or less of which remain, falls to half the normal amount (step S1405), and the processing proceeds to a step S1406. At this time, a display screen shown in FIG. 14D, for example, is displayed on the operating section 9.

When it is determined not to execute the process that reduces the image formation speed in accordance with the maintenance time period, the process in step S1405 is skipped and the processing proceeds to the step S1406.

Next, it is determined whether refilling of the consumables has been completed (the step S1406). When the refilling of the consumables has not been completed, the processing returns to the step S1404, while when the refilling of the consumables has been completed, the sheet feeding speed is restored to the normal speed or the sheet feeding interval is restored to the normal interval (step S1407), and the processing returns to the step S1007 in FIG. 9. At this time, a display screen shown in FIG. 14E, for example, is displayed on the operating section 9.

As described above, according to the present embodiment, depending on the error or warning in the MFP, a mode that stops or does not stop the motor that drives conveying parts to convey recording sheets is set by the motor driving control section 12 (steps S1004 to S1006), the maintenance time period until the MFP error or warning is removed and the MFP recovers is set (step S1203, step S1403), and the operation of the motor driving control section 12 is controlled in accordance with the set maintenance time period (step S1205, step S1405). When the MFP error or warning has been cleared, the operation control of the motor driving control section 12 is returned to normal (step S1207, step S1407), and therefore even if an error that makes image formation of the job being executed impossible has occurred, it will be possible to appropriately control the maintenance time period required until an image formation operation is resumed in accordance with the state of the error.

It is also possible to provide an MFP capable of reducing the time required to resume image formation by appropriately controlling whether a stopped state transferring process is executed in a case where the printer section 2 is in the operating state and an error that makes image formation by the image forming apparatus impossible has occurred.

Since the image formation speed is reduced in accordance with the maintenance time period by halving the speed of the recording sheets or increasing the time interval of sheet feeding from the upper cassette 204 or the lower cassette 205, it is possible to reduce the consumed amount of sheets, the amount of which has fallen to a predetermined amount or less, to half the normal amount.

Although, it is possible in the above described embodiment to set the estimated recovery time until the apparatus error or warning is removed and the apparatus recovers by inputting from the operating section 9, an estimated recovery time determined in advance in accordance with the type of apparatus error or warning may be set instead. For example, when table data in which the relationship between the type of apparatus error or warning and the estimated recovery time is determined, such as where the estimated recovery time for refilling sheets is five minutes, the estimated recovery time for refilling toner is ten minutes, and the estimated recovery time for clearing a paper jam is five minutes, is stored in the memory 124, the CPU 123 may read the table data and automatically set the estimated recovery time based on the type of apparatus error or warning.

It is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read out from the storage medium realizes the functions of the above described embodiment, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

This application claims the benefit of Japanese Application No. 2005-118841, filed Apr. 15, 2005, which is hereby incorporated by reference herein in its entirety.

What is claimed is:

1. An image forming apparatus that forms an image on a recording medium, comprising:
   an image information input section that inputs image information;
   an image forming section that forms an image on a recording medium based on the input image information inputted by said image information input section;
   an operating state processing section that executes an operating state transferring process that causes said image forming section to transfer from a stopped state to an operating state and a stopped state transferring process that causes said image forming section to transfer from the operating state to the stopped state; and
   a control section that controls whether the stopped state transferring process is to be executed by said operating state processing section in a case where said image forming section is in the operating state and an error that makes image formation by the image forming apparatus impossible has occurred.

2. An image forming apparatus according to claim 1, further comprising a selection section that allows an operator of the image forming apparatus to select whether the stopped state transferring process is to be executed by said operating state processing section in accordance with an error that makes image formation by the image forming apparatus impossible having occurred in a case where said image forming section is in the operating state,
   wherein said control section controls said operating state processing section to execute the stopped state transferring process in a case where said selection section has selected that the stopped state transferring process is to be executed, and not to execute the stopped state transferring process in a case where said selection section has selected that the stopped state transferring process is not to be executed.

3. An image forming apparatus according to claim 2, wherein said selection section allows the operator of the image forming apparatus to select whether the stopped state transferring process is to be executed via a display section that displays a screen for allowing the operator of the image forming apparatus to select whether the stopped state transferring process is to be executed.

4. An image forming apparatus according to claim 1, further comprising an input section that inputs a necessary time period required until the image forming apparatus is capable of carrying out image formation in accordance with an error that makes image formation by the image forming apparatus impossible having occurred in a case where said image forming section is in the operating state, wherein in a case where the error that makes image formation by the image forming apparatus impossible is still present when the necessary time period has elapsed following input of the necessary time period by said input section, said operating state processing section carries out the stopped state transferring process in accordance with the necessary time period having elapsed.

5. An image forming apparatus according to claim 4, wherein said input section inputs the necessary time period based on the error that makes image formation by the image forming apparatus impossible.

6. An image forming apparatus according to claim 1, further comprising an input section that inputs a necessary time period required until the image forming apparatus is capable of carrying out image formation in accordance with an error that makes image formation by the image forming apparatus impossible having occurred in a case where said image forming section is in the operating state, wherein said control section controls, based on the necessary time period, an image formation speed by said image forming section in a case where an error that makes image formation by the image forming apparatus impossible has occurred and the stopped state transferring process is not carried out.

7. An image forming apparatus according to claim 1, further comprising an input section that inputs a necessary time period required until the image forming apparatus is capable of carrying out image formation in accordance with an error that makes image formation by the image forming apparatus impossible having occurred in a case where said image forming section is in the operating state, wherein said operating state processing section carries out the stopped state transferring process in a case where the inputted necessary time period is longer than a total of a stopped state transferring time period required by the stopped state transferring process and an operating state transferring time period required by the operating state transferring process.

8. An image forming apparatus according to claim 1, further comprising a determining section that determines whether the operating state of the image forming section is capable of being maintained in a case where said image forming section is in the operating state and an error that makes image formation by the image forming apparatus impossible has occurred, wherein said control section controls said operating state processing section to maintain the operating state in a case where said determining section has determined that the operating state of the image forming section is capable of being maintained, and controls said operating state processing section to carry out the stopped state transferring process in a case where said determining section has determined that the operating state of the image forming section is not capable of being maintained.

9. An image forming apparatus according to claim 1, wherein said image forming section includes:
an image carrying section that carries a developer image based on the image information;
a transfer section that transfers the developer image carried by said image carrying section onto the recording medium; and
a cleaning section that removes the developer image that is not transferred onto the recording medium and remains on said image carrying section;
and wherein the stopped state transferring process relates to cleaning of the developer image by said cleaning section.

10. An image forming apparatus according to claim 1, wherein said image forming section includes:
an image carrying section that carries a developer image based on the image information;
a transfer section that transfers the developer image carried by said image carrying section onto the recording medium; and
a density control section that controls a density of the developer image carried by said image carrying section;
and wherein the stopped state transferring process relates to control of the density by said density control section.

11. An image forming apparatus according to claim 1, wherein said image forming section includes:
an image carrying section that carries a developer image based on the image information;
a transfer section that transfers the developer image carried by said image carrying section onto the recording medium; and
a developer supplying section that supplies developer to said image carrying section;
and wherein an error that makes image formation impossible occurs for the image forming apparatus in a case where an amount of developer to be supplied to said developer supplying section is a predetermined amount or less.

12. An image forming apparatus according to claim 1, further comprising a conveying section that conveys the recording medium,
wherein an error that makes image formation impossible occurs for the image forming apparatus in a case where said conveying section is incapable of conveying the recording medium.

13. An image forming apparatus according to claim 1, further comprising a recording medium supplying section that supplies the recording medium,
wherein an error that makes image formation impossible occurs for the image forming apparatus in a case where said recording medium supplying section is incapable of supplying the recording medium.

14. A method of controlling an image forming apparatus including an image forming section that forms an image on a recording medium, the method comprising:
an image forming step of forming an image on a recording medium based on inputted image information;
an operating state processing step of executing an operating state transferring process that causes the image forming section to transfer from a stopped state to an operating state and a stopped state transferring process that causes the image forming section to transfer from the operating state to the stopped state; and a control step of controlling whether the stopped state transferring process is to be executed by said operating state processing step in a case where the image forming section is in the operating state and an error that makes image formation by the image forming apparatus impossible has occurred.

* * * * *